US008524063B2

(12) United States Patent
Hughes et al.

(10) Patent No.: US 8,524,063 B2
(45) Date of Patent: Sep. 3, 2013

(54) MICRO-ELECTRODE DEVICE FOR DIELECTROPHORETIC CHARACTERISATION OF PARTICLES

(75) Inventors: Michael P. Hughes, Liphook (GB); Kai F. Hottges, Guildford (GB); Henry Oluseyi Olajide Fatoyinbo, London (GB)

(73) Assignee: The University of Surrey (GB)

( * ) Notice: Subject to any disclaimer, the term of this patent is extended or adjusted under 35 U.S.C. 154(b) by 914 days.

(21) Appl. No.: 11/990,540

(22) PCT Filed: Aug. 16, 2006

(86) PCT No.: PCT/GB2006/003070
§ 371 (c)(1),
(2), (4) Date: May 5, 2008

(87) PCT Pub. No.: WO2007/020443
PCT Pub. Date: Feb. 22, 2007

(65) Prior Publication Data
US 2009/0229980 A1 Sep. 17, 2009

(30) Foreign Application Priority Data
Aug. 16, 2005 (GB) .................................. 0516783.8

(51) Int. Cl.
*G01N 27/447* (2006.01)
*G01N 27/453* (2006.01)
*B01D 57/02* (2006.01)

(52) U.S. Cl.
USPC ...................... 204/643; 204/403.01; 205/792

(58) Field of Classification Search
USPC ........... 204/403.01–403.15; 205/775–794.5; 600/345–348; 435/173.4–173.6, 446, 450
See application file for complete search history.

(56) References Cited

U.S. PATENT DOCUMENTS 3,930,982 A 1/1976 Batha et al.
5,865,657 A * 2/1999 Haven et al. .................... 445/24
6,033,547 A * 3/2000 Trau et al. ..................... 204/622
6,596,143 B1 * 7/2003 Wang et al. .................... 204/547
6,875,329 B2 * 4/2005 Washizu et al. ............... 204/547

(Continued)

FOREIGN PATENT DOCUMENTS

WO WO-99/60392 A1 11/1999
WO WO-03/014739 A1 2/2003
WO WO-2007/020443 A1 2/2007

OTHER PUBLICATIONS

Hughes et al. "Dielectrophoretic manipulation and characterization of herpes simplex virus-1 capsids" Eur Biophys J (2001) 30: 268-272.*

(Continued)

*Primary Examiner* — Keith Hendricks
*Assistant Examiner* — Susan D Leong
(74) *Attorney, Agent, or Firm* — McCarter & English, LLP; Maria Laccotripe Zacharakis; Ishna Neamatullah

(57) ABSTRACT

A device for dielectrophoretic manipulation of suspended particulate matter comprises an analysis electrode and a separate cover electrode wherein the analysis electrode comprises an electrically conductive layer of material provided on a substrate support and apertures are defined through the electrically conductive layer. The device can be used for detection, analysis, fractionation, concentration or separation of particulate matter.

49 Claims, 16 Drawing Sheets

(56) References Cited

U.S. PATENT DOCUMENTS

| | | | | |
|---|---|---|---|---|
| 7,666,285 | B1 * | 2/2010 | Cho et al. | 204/403.01 |
| 2005/0040044 | A1 | 2/2005 | Frenea et al. | |
| 2006/0024802 | A1 * | 2/2006 | Muller et al. | 435/173.1 |
| 2006/0070957 | A1 * | 4/2006 | Hughes et al. | 210/748 |

OTHER PUBLICATIONS

International Preliminary Report on Patentability for Application No. PCT/GB2006/003070, dated Nov. 9, 2007.

International Search Report for Application No. PCT/GB2006/003070, dated Nov. 10, 2006.

* cited by examiner

Yeast cells suspended over a single 150 micron dot.
Illumination originating from beneath the suspension.

MICRO-ELECTRODE DEVICE FOR DIELECTROPHORETIC CHARACTERISATION OF PARTICLES

The present invention relates to a device and a method for dielectrophoretic manipulation, characterisation and detection of suspended particulate matter. In addition the invention relates to a method for dielectrophoretic manipulation and a method for production of the device.

Within the context of the present application, the word “comprises” is taken to mean “includes among other things”, and is not taken to mean “consists of only”.

The terms electrically “non-conductive” and “insulating” as used herein are interchangeable and have the same meaning. They are interpreted to mean “substantially electrically non-conductive”.

The term “manipulation” is interpreted to include known laboratory or plant techniques including analysis, filtration, fractionation, collection or separation.

The term “about” is interpreted to mean +/−20%, more preferably +/−10%, even more preferably +/−5%, most preferably +/−1%.

A neutrally charged particle subjected to a non-uniform AC electric field will become polarised and exhibit motion towards or away from the electrode edge generating the field non-uniformity. The induced motion of the particle is termed dielectrophoresis (DEP) [1].

Dielectrophoresis (DEP) forms the basis of techniques for separation based on the manipulation of particles in non-uniform electric fields. It can be used for separation of particles, either by binary separation of particles into two separate groups, or for fractionation of many populations. It can also be used for the collection of particles and for transport of particles along an electrode array. Separation is based generally on exploitation of differences in the dielectric properties of populations of particles. This enables a heterogeneous mix of particles to be fractionated by exploiting small differences in polarizability or by using a dielectrophoretic force in conjunction with other factors such as imposed flow or particle diffusion.

If a dielectric particle is suspended in an electric field, it will polarize and there is an induced dipole. The magnitude and direction of this induced dipole depends on the frequency and magnitude of the applied electric field, and the dielectric properties of particle and medium. The interaction between the induced dipole and the electric field can generate movement of the particle, the nature of which depends on a number of factors including the extent to which the field is non-uniform both in terms of magnitude and phase.

If the electric field is uniform, the attraction between the dipolar charges and the electric field is equal and opposite and the result is no net movement, unless the particle carries a net charge and the field frequency is equal to, or near, zero. However, if the field is spatially non-uniform, the magnitude of the forces on either side of the particle will be different, and a net force exists in the direction in which the field magnitude is greatest. Since the direction of force is governed by the spatial variation in field strength, the particle will always move along the direction in which the electric field increases by the greatest amount; that is, it moves along the direction of greatest increasing electric field gradient regardless of field polarity. Since the direction of motion is independent of the direction of the electric field polarity, it is observed for both AC and DC fields; the dipole reorients with the applied field polarity, and the force is always governed by the field gradient rather than the field orientation. The magnitude and direction of the force along this vector is a complex function of the dielectric properties of particle and medium. If a force exists in a direction of increasing field gradient, it is termed positive DEP. Its opposite effect, negative DEP, acts to repel a particle from regions of high electric field gradient, moving it “down” the field gradient. Whether a particle experiences positive or negative DEP is dependent on its polarizability relative to its surrounding medium; differences in the quantity of induced charge at the interface between particle and medium lead to dipoles oriented counter to the applied field (and hence positive DEP) where the polarizability of a particle is more than that of the medium, and in the same direction as an applied field (and hence negative DEP) where it is less. Since relative polarizability is a complex function dependent not only on the permittivity and conductivity of the particle and medium, but also on the applied field frequency, it has a strong frequency dependence and particles may experience different dielectrophoretic behaviour at different frequencies.

Thus, an imbalance of Coulomb forces exerted on a neutrally charged particle by non-uniform electric fields will impart a net force that is either positive or negative. By considering a spherical particle with a diameter d, a dipole moment is formed when the particle is placed in a non-uniform electric field. The build up of charges at the interface of the particle and the suspending medium will have different numbers of positive and negative charges as a result of the field gradient. It can be shown that the complex effective moment ($m_{eff}$) of a spherical dipole is given by equation 1 [23]. Where r is the radius of the particle, E is the electric field, $\in_0$ is the permittivity of free space and $\in^*$ is the complex permittivity relating to either the particle or the suspending medium.

$$m_{eff} = 4\pi r^3 \varepsilon_o \left( \frac{\varepsilon_p^* - \varepsilon_m^*}{\varepsilon_p^* + 2\varepsilon_m^*} \right) E \qquad \text{Equation 1}$$

The term in the brackets of equation 1, known as the Clausius-Mossotti factor (K(ω)), provides information about the magnitude and phase of the effective dipole moment. Because the Clauslus-Mossotti factor is a complex number, the magnitude and phase are functions of the applied frequency, ω.

The net dielectrophoretic (DEP) force acting upon a dielectric sphere can be found by taking the real (in-phase) part of the Clauisus-Mossotti factor.

$$F_{DEP} = 2\pi r^3 \in_0 \in_m Re[K(\omega)] \nabla E_{RMS}^2 \qquad \text{Equation 2}$$

From Equations 1 and 2 it can be seen that the important factors affecting the dielectrophoretic force are $\nabla E_{RMS}^2$, describing the non-uniform spatial distribution of the field magnitude, and Re[K(ω)], the in-phase part of the induced dipole moment in the particle, which can take values between $-0.5 < Re[K(\omega)] < 1$. The DEP force directs particles towards (Re[K(ω)]>0) or away (Re[K(ω)]<0) from strong field regions.

DEP can be used for detection, fractionation, concentration or separation of complex particles. Additionally, studying the DEP behaviour of particles at different frequencies can allow the study of the dielectric properties of those particles. For example, it can be used to examine changes in cell cytoplasm in cells after infection by a virus. This potentially enables detection where the differences between cell types are subtle and could be applied to the detection of cancerous or healthy cells, viable or non-viable cells, leukemic cells in blood, different species of bacteria and placental cells in maternal blood.

AC electrokinetics techniques, in particular dielectrophoresis and electrorotation, can also be used to characterise the behaviour of cells and furthermore the electrical properties of cells [2-5]. These provide a means for the determining the state of different cell types and the behaviour of cells in different physiological environments. It has been used to assess multidrug resistance of cancer cells, monitoring of changes to yeast induced with antibiotics, membrane changes associated with temperature-sensitive cells and water quality testing [6-9]. The characteristic frequency dependent spectrum of a particle is a valuable tool when wishing to perform separation techniques. Dielectrophoresis can exploit subtle differences in a particle's make-up such as surface charge, compartmental ionic compositions and size based on a particle's response to an applied frequency. This has enabled cancerous cells being separated from normal erythrocytes, separation of viable and non-viable yeast cells and formulations of strategies useful for separation with AC electrokinetics [10-13].

Methods of determining the frequency dependent spectrum of a particle have been based on a microscopy based technique developed by Pohl (1978). These methods are laborious and time consuming as an individual is required to continually observe particle motion over a predetermined interval for each frequency point or collect time Interval photographs of the run experiments. Electrorotation experiments have been used extensively and the relationships between electrorotation and dielectrophoresis have been discussed at length elsewhere [14-16].

Using castellated electrodes, Price et al used an optical technique to rapidly study the dielectrophoretic behaviour of micro-organisms as a function of magnitude and frequency of the applied electric field. They were able to obtain information that had dominant influences on the dielectrophoretic effects in micro-organisms. Burt et al also developed an optical system which measured the response of suspended particles to low frequency electric fields, with the aim of taking into account the influences of electrode polarisation effects. It was later noted by Talary and Pethig that with the use of interdigitated, castellated electrode geometry, cells were being collected at the electrodes under both positive and negative dielectrophoresis. Hence an optical system for the measurements of both positive and negative dielectrophoresis based on a dual beam laser was designed by them [17-19].

Thus, it is clear that DEP can be a versatile technique for detection, analysis, fractionation, concentration or separation. In view of this, significant interest is being invested in dielectrophoresis technology. Thus, there is a need for new devices for dielectrophoretic characterisation of particulate matter.

Finding a technique for assessing the results of experiments performed in a small volume can be difficult, especially since most known detection methods require the presence of an indicator or dye that might itself interact with the organism or the drug candidate. Therefore, DEP can be a valuable technique since it can be used detect changes in the morphology of cells without any marker chemicals.

In view of the fact that DEP can separate particles based on their dielectric properties, bacteria or cells can be detected based on properties of the cell wall or membrane. This can be used for bioassays to evaluate whether a drug candidate interacts with a receptor at the cell wall or membrane.

Remarkably, it has now been found that an electrode system can be used whereby the positive and negative dielectrophoretic effects on a suspension of particles are clearly evident and the magnitudes are determined through image processing techniques of regions within the electrode system. For cell populations of $10^8$ cells per ml using no more than 20 μl samples in the system, a rapid technique for the determination of a particles dielectrophoretic spectrum is shown. This has applications for rapidly constructing bioseparation protocols based on media conductivities and electric field frequencies. It also provides a valuable tool in the rapid determination of a particles crossover frequency which can be used to derive valuable information about a particles biophysical state [3, 8, 20-22].

Accordingly, in a first aspect the present invention provides a microelectrode device for dielectrophoretic characterisation of particles which comprises an analysis electrode and a separate cover electrode wherein the analysis electrode comprises an electrically conductive layer of material provided on a substrate support and apertures (referred to herein as dots) are defined through the electrically conductive layer. Preferably, only the analysis electrode and the cover electrode are present.

An advantage of the present invention is its flexible operability. For example it may be used to characterise fractions of biological matter, eg cells in a cell culture suspension. A further advantage of the present invention is its high throughput compared to known devices.

Preferably, the electrically conductive layer is planar. Preferably, the cover electrode is planar. More preferably, the surfaces of the cover electrode and the analysis electrode facing each other are planar and parallel.

Preferably a spacer is positioned between the cover electrode and the analysis electrode. The spacer is preferably not electrically conductive. Preferably the spacer is manufactured of PTFE, PE, PET, parafilm, polysulfone, polyimide, epoxy, glass, silicon oxide. Alternatively, the spacer is manufactured of beads or rods embedded in a soft gasket material eg PDMS, rubber or latex. Most preferably, the spacer is of parafilm.

Preferably the analysis electrode is connected to one phase of an AC voltage source and the cover electrode is connected to either a counter phase or ground of an AC voltage source.

Preferably a sample medium is placed between the analysis electrode and the cover electrode and the sample medium consists of particles suspended in a solvent. More preferably, the sample medium consists of bio-particles such as cells, bacteria, spores or virus particles suspended in a solvent. Most preferably, the sample medium consists of particles suspended in an aqueous solvent.

Preferably, the substrate of the analysis electrode is of a transparent material.

Preferably, a plurality of apertures is defined through the electrically conductive layer of material of the analysis electrode.

Preferably, the apertures are independently addressable with a multitude of different frequencies.

Preferably, the size of the apertures ranges from between about 25 μm to about 1000 μm, more preferably about 150 μm to about 500 μm.

Circular apertures are preferred because a high degree of symmetry facilitates image analysis. However, other geometries (eg squares, hexagons etc) could be employed.

The apertures are preferably configured in an array wherein the centres of the apertures are positioned in a square grid. This has an advantage over interdigitated designs since it allows connection of power to the electrode adjacent each aperture from all sides (not just one side as would be achieved with an interdigitated configuration). Therefore, the invention achieves the advantage of a more homogenous power distribution. This is particularly advantageous if either the medium is very conductive or if the electrode material has a high sheet resistance. In addition, it provides an array which has a high tolerance to defects such as scratches and pinholes since these defects would be unlikely to sever the electrical connection completely.

Preferably, the surface of the analysis electrode is spaced about 30 μm to about 500 μm, more preferably 125 μm to 250 μm from the surface of the cover electrode.

Preferably, the electrically conductive layer of the analysis electrode is of a transparent material. More preferably, both of the electrically conductive layer and the substrate are of transparent material.

Preferably, the analysis electrode comprises an electrically conductive layer of one or more of gold, chromium, titanium, platinum or indium tin oxide. More preferably, the electrically conductive material is selected from at least one of indium tin oxide, gold, chromium, titanium or platinum.

Preferably, the substrate of the analysis electrode is manufactured of a material that comprises glass, quartz, polycarbonate, polyethyleneterephtalate, polysulfone polymethylmethacrylate, polyimide or other transparent materials. More preferably, the substrate of the analysis electrode is manufactured of a material selected from glass, quartz, polycarbonate, polyethyleneterephtalate, and polysulfone polymethylmethacrylate or polyimide.

Preferably, the apertures extend through the entire conductive layer of material are of a circular cross section.

Preferably, the aperture through the 'analysis electrode' Is annular leaving a circular 'island' in the centre of the aperture made of a material that is not electrically connected to the analysis electrode or the cover electrode.

Preferably, the material of the 'island' is of a conductive material and it is not electrically connected to the analysis electrode. Preferably, the material of the 'island' comprises one or more of a colloid metal, gold, chromium, titanium, platinum or indium tin oxide. More preferably, the material of the 'island' is selected from at least one of a colloid metal, indium tin oxide, gold, chromium, titanium or platinum. Preferably, the material of the 'island' is of a different conductive material to the 'analysis electrode'.

Preferably, an AC signal of between about 100 Hz and about 100 MHz is capable of being applied between the 'analysis electrode' and the 'cover electrode'. Preferably, an AC signal between about 0.1V (peak to peak) and about 100V (peak to peak) is capable of being applied between the 'analysis electrode' and the 'cover electrode'. (Preferably 1V (peak to peak) and 20V (peak to peak)). Accordingly, preferably, an AC power source is electrically connected between the analysis electrode and the cover electrode.

In a second aspect the invention provides an enhanced device wherein the 'analysis electrode' is used as a detection surface for a surface detection technique.

For example, in a preferred embodiment, the 'analysis electrode' provides a surface of a quartz crystal microbalance, a surface plasmon resonance detector, an evanescent light scattering detector, or a surface enhanced Raman detector.

In an alternative preferred embodiment, the substrate of the 'analysis electrode' where it is exposed through the aperture is coated with one or more antibodies immobilised on the surface of the substrate.

Alternatively, the 'islands' of the analysis electrode are coated with one or more antibodies immobilised on the surface of the 'Islands'.

Preferably, the 'island' of the analysis electrode is used for surface enhanced Raman detection.

Preferably, the antibody is preselected and is specific for a 'bioparticle' (eg a cell, bacteria, spore, virus particle, or protein).

Preferably, the 'bioparticle' is fluorescence labelled before binding to the surface bound antibodies. Alternatively, the 'bioparticle' is fluorescence labelled after binding to the surface bound antibodies. Even more preferably, fluorescence detection is used to detect the 'bioparticle'.

With regard to cost, the invention provides the advantage that a device for dielectrophoretic characterisation of suspended particulate matter can be produced with low fabrication costs. In addition, because a device according to the invention enables highly parallel characterisation, it is well suited to disposable cartridge-based methods for medical and biological applications.

In a third aspect the invention provides a method of carrying out dielectrophoresis of particles which comprises use of a device according to the first of second aspects of the Invention.

Preferably, the method is used to characterise particles according to their polarizability with regard to their medium.

Preferably, the method comprises the steps of placing a sample suspension of particulate matter between electrodes of a device according to an embodiment of the invention and generating a field between the electrodes.

Advantageously, the positive and negative dielectrophoretic effects on a suspension of particles are clearly evident and the direction and magnitude of the force applied to the particles can be determined by optical detection.

Preferably, positive dielectrophoresis is used to attract particles to the edge of the aperture through the electrically conductive layer of material of the 'analysis electrode', in the same plane as the planar abutment between the electrically conductive layer of material of the 'analysis electrode' and the substrate of the 'analysis electrode'.

Preferably, negative dielectrophoresis is used to push particles to the centre of the aperture in the 'analysis electrode', in the same plane as the planar abutment between the electrically conductive layer of material of the 'analysis electrode' and the substrate of the 'analysis electrode'.

Preferably, the method includes the step of using image-processing techniques (eg photography) to analyse different regions of an aperture in the 'analysis electrode' separately.

Preferably, the method includes the step of using image processing to measure concentration of particles at the edge of the aperture by analysing an annulus radially inwardly from the perimeter of the aperture.

Preferably, the method includes the step of using image processing to measure concentration of particles in the centre of the aperture by analysing a circular disk in the centre of the aperture.

Preferably, the method includes the step of using image processing to measure strength and direction of the dielectrophoretic force by comparing the concentration of particles at the edge of the aperture with the concentration of particles in the centre of the aperture.

Preferably, an embodiment of the invention is used for characterisation of a predetermined particle from a particle-laden liquid or gas (e.g. cells in blood).

Preferably, an embodiment of the method is used for high throughput screening.

Preferably, an embodiment of the invention is used in conjunction with one or more known assays. For example the invention can be used in conjunction with other conventional assays such as fluorescence-based assays or antibody-based assays.

In a fourth aspect the invention provides a method for production of a device according to an aspect of the invention which comprises the steps of providing an analysis electrode and a separate cover electrode wherein the analysis electrode comprises an electrically conductive layer of material provided on a substrate support and apertures are defined through the electrically conductive layer.

In a particularly preferred embodiment, the invention provides a device having three electrodes wherein the analysis electrode is situated between the cover electrode and the third electrode.

Preferably, the third electrode is planar and more preferably it is parallel with the analysis electrode.

Preferably, the third electrode and the analysis electrode are separated by a dielectric material. Preferably, the dielectric material is non-conducting. Preferably, the dielectric material has a uniform thickness. Preferably, this thickness is about 10 nm to about 100 μm, more preferably about 50 nm to about 10 μm, most preferably about 100 nm to about 1 μm.

Preferably the third electrode is positioned on a substrate of a transparent material such as one or more of glass, quartz, polycarbonate, polyethyleneterephtalate, polysulfone, and polymethylmethacrylate.

Preferably, the third electrode has no apertures defined therein.

Preferably, the third electrode has a uniform thickness, more preferably the thickness is equal or less than about 1 μm.

Preferably, the third electrode is of a conducting material, more preferably it is of one or more of a transparent conducting film (TCO), gold, indium tin oxide, platinum, chromium or cadmium stannate. Most preferably it is of a transparent conducting film (TCO).

Preferably, the third electrode provides a detection surface for a surface detection technique.

While a device according to an embodiment of the present invention is generally suitable for the characterisation of any polarizable particular matter in a liquid suspension, it is preferred that its main application is in the fields of microbiology, biotechnology and medicine, for the characterisation of polarisable biological matter. Such biological matter includes viruses or prions, cell components such as chromosomes or biomolecules such as oligonucleotides, nucleic acids, etc., as well as prokaryotic and eukaryotic cells, and preferably comprises plant, animal or human tissue cells. It may be used to characterise different kinds of biological material such as cancerous and non-cancerous cells. Furthermore, it is considered that the invention will find utility in water testing, testing for pharmaceuticals and in the brewing industry.

Additional features and advantages of the present invention are described in, and will be apparent from, the description of the presently preferred embodiments which are set out below with reference to the drawings in which.

Figure 16:
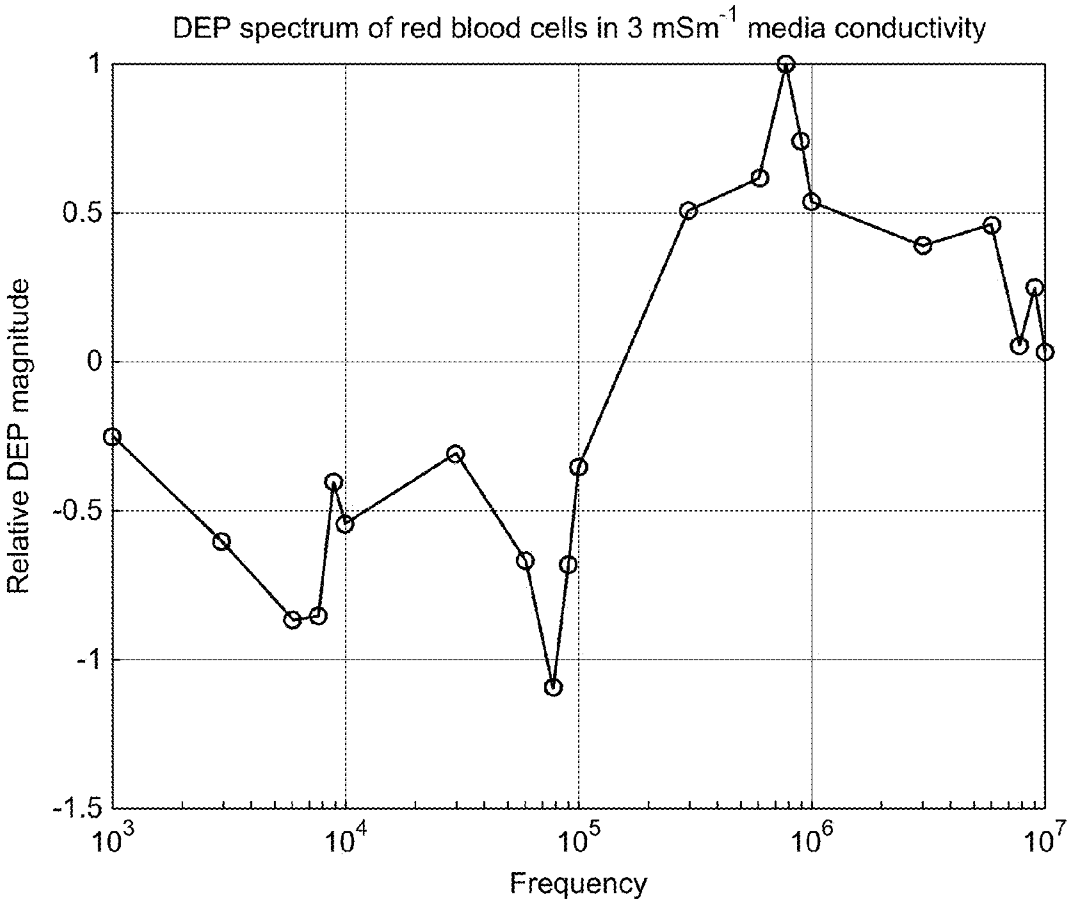

FIG. 16 shows the dielectrophoretic spectra of red blood cells suspended in 3 $mSm^{-1}$ KCl solution. There is a crossover frequency at ~180 kHz. The DEP crossover frequency determined by Becker et al for erythrocytes in isotonic solution gives a comparison to their crossover frequency as determined in different media conductivity [10].

Figure 17:
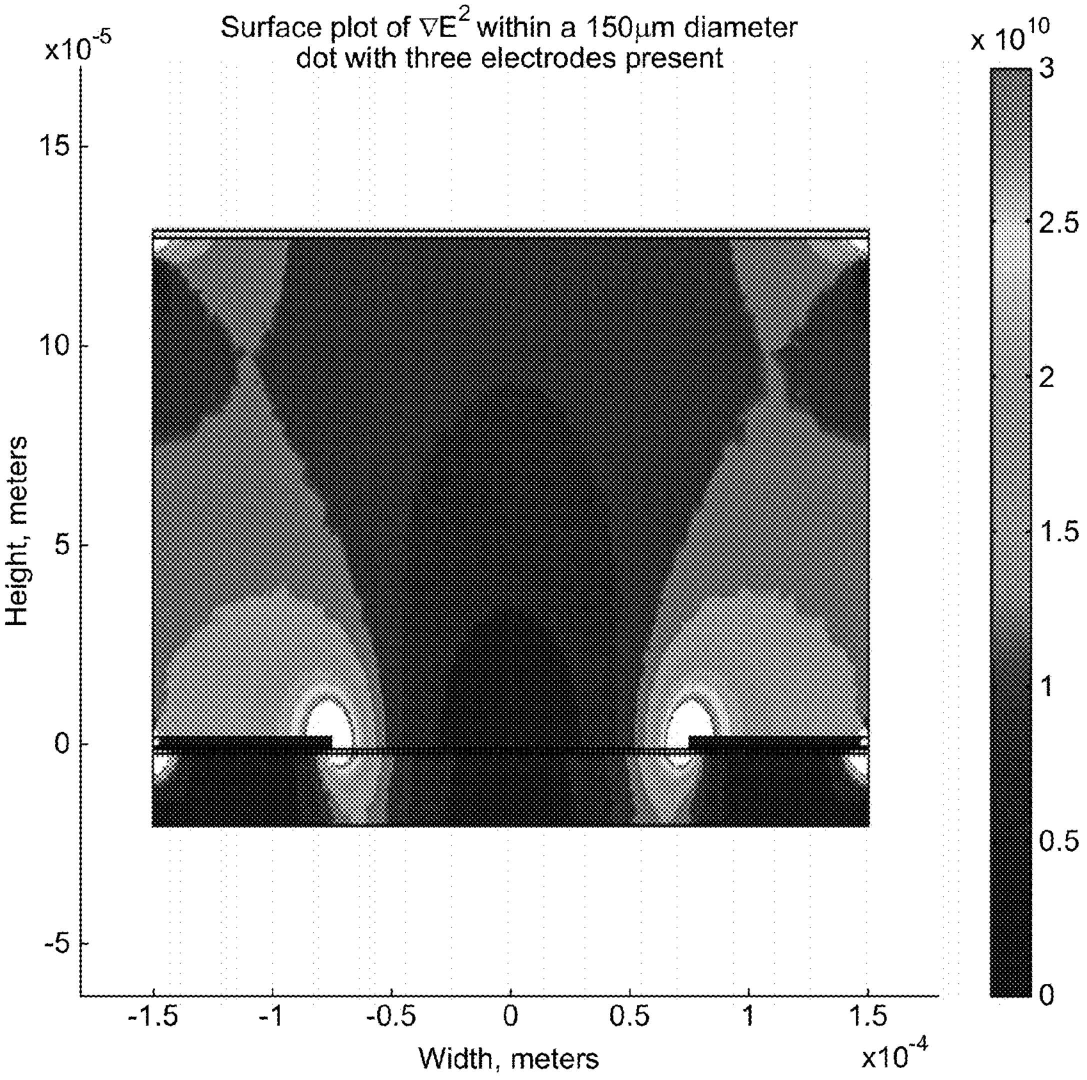

FIG. 17 shows surface plot of the Electric field gradient within a 3 Electrode device according to the invention. With the third electrode grounded, and the top and analysis electrodes energised as normal, there is no significant difference in the electric field gradient distribution.

For the purposes of clarity and a concise description features are described herein as part of the same or separate embodiments, however it will be appreciated that the scope of the invention may include embodiments having combinations of all or some of the features described.

As described above, the invention provides a novel micro-electrode device has been developed to obtain the dielectrophoretic spectrum of a suspension of homogeneous particles in a period significantly faster than traditional characterisation techniques. The micro-electrode device used comprises two parallel planar electrodes placed one above the other, with the lower electrode being the analysis electrode having circular regions etched away to reveal an array of dots (termed a "dot array") of variable dimensions.

Rapid characterisation is largely dependent on the concentration of the particles used, with the size of the dots also playing a crucial role in speed. For a particle diameter of 6-10 μm it is considered that a concentration of $10^8$ particles per ml should be used to rapidly obtain the DEP spectrum using dots having a diameter of 150 μm. The invention has been used to provide the dielectrophoretic spectra of yeast cells in a number of suspending media, along with field simulations of variable dimensions of the electrode device employed for the characterisation. It has also been shown how the DEP spectrum of red blood cells can be obtained with a cell suspension of $10^8$ cells per ml using a 20 μl sample.

Figure 1:
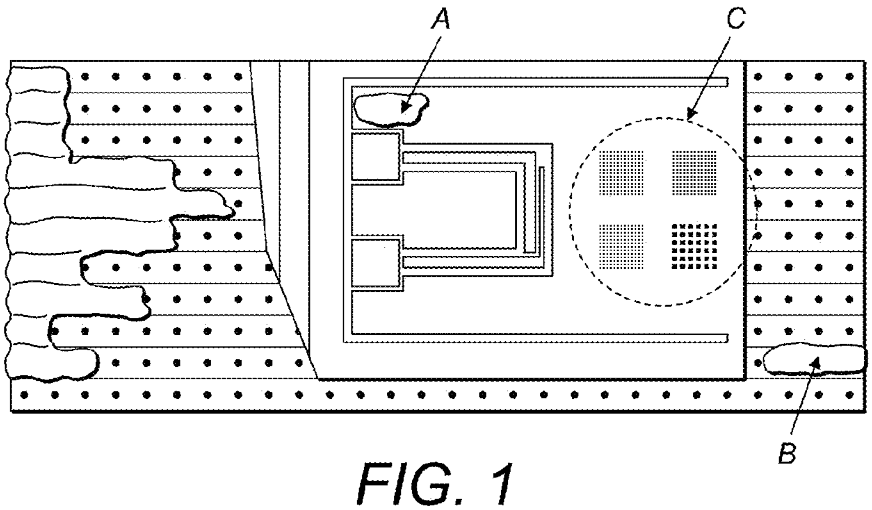
FIG. 1 shows dot geometry on analysis electrode mounted onto a strip board.

As seen in FIG. 1, a device for dielectrophoretic manipulation of suspended particulate matter comprises a cover electrode and an analysis electrode.

The upper, cover electrode, an ITO (indium tin oxide) covered glass slide, was chosen to provide a transparent view between the two electrodes where the cells are being manipulated.

The lower, analysis electrode was mounted unto a copper-coated strip-board with heat curing epoxy as shown below. An observation window was cut through the strip-board underneath the analysis electrode. Electrical connections are made via soldering on the board and connecting a thin road-runner cable to the electrode with silver epoxy at A. Ground was connected to the cover electrode via a connection made at B. The cover electrode and the analysis electrodes were separated by heat treated parafilm 120 μm thick.

EXAMPLE

Materials and Methods

Field Simulations

Using commercial finite element software (ANSYS 6/Femlab 3) we were able to model the electrode system in 2 dimensions for dot diameters of 150 μm, 250 μm and 500 μm. The spacing between the cover and analysis electrodes was given a constant dimension of 123 μm. The analysis electrodes of the model represent the electrode surface encircling the dot, and expand to half the diameter of the dot region in both directions, i.e. for a dot diameter of 150 μm, the analysis electrodes either side of the dot region will span 75 μm in length. Using the electromagnetic discipline of the software, we were able to obtain the electric field distribution in the suspending medium by assigning material properties (permittivities) to each region of the model. Relative permittivities of 4.4, 10, 78 and 1 were assigned to the glass substrate, ITO (indium tin oxide), suspending medium and the gold respectively. Voltage values of 10V and −10V were applied to the analysis electrodes and to the cover ITO electrode respectively, for all simulations.

Yeast

A spatula of yeast pellets (Allinson Dried Yeast) was cultured in sterile YPD media (10 ml) and incubated at 30° C. for 18 hours. The cells were then resuspended in distilled water centrifuged and washed (×3) before being finally re-suspended in 280 mM mannitol, adjusted to 5 mS $m^{-1}$ by adding a small amount of phosphate buffer (pH7) at a concentration of $1.29\times10^9$ cells per ml. Suspensions of different cell concentrations were made by resuspending calculated aliquots from the stock solution into the appropriate media solution.

Dot Electrode System

CorelDraw was used to design the dot arrays in dimensions of 150 μm, 250 μm, 300 μm and 500 μm using a process described by Hoettges et al [24]. The design was transferred unto a gold coated microscope slide (courtesy of the EPSRC) cut to 38 mm×25 mm, through photolithography (near-UV light corresponding to 436 nm) and wet chemical etching. The upper cover electrode, an ITO (indium tin oxide) (4-8 Ohm, Delta Technologies, Stillwater, Minn., USA) covered glass slide, was chosen to provide a transparent view between the two electrodes where the cells are being manipulated.

The lower, analysis electrode was mounted unto a copper-coated strip-board with heat curing epoxy as shown below. An observation window was cut through the strip-board underneath the analysis electrode. Electrical connections are made via soldering on the board and connecting a thin road-runner cable to the electrode with silver epoxy at A. Ground was connected to the top ITO cover slide via a connection made at B in FIG. 1. The cover and analysis electrodes were separated by heat treated parafilm 120 μm thick.

Determination of Dielectrophoretic Spectra Using Imaging Techniques

Figure 2:
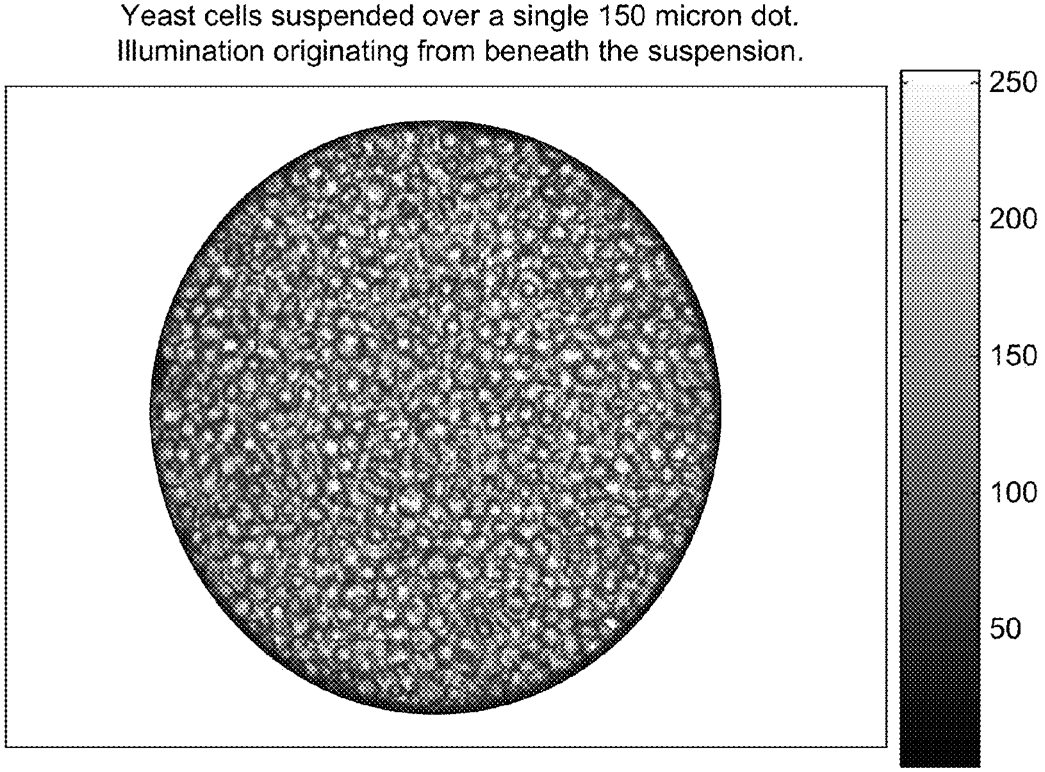
FIG. 2 shows an image of yeast cells suspended over a 150 micrometer diameter dot.

A 20 μl aliquot of cell suspension was taken from a stock solution of $10^8$ cells per ml and was pippetted unto the dot array. The sample was suspended over an array of 150 μm diameter dots and enclosed by a sheet of heat cured parafilm, cut to expose the array. The ITO coated cover glass was then placed parallel to the analysis electrode, over the suspension, and the electrode system was held down securely on the microscope stage with a pair of non-conductive brackets. A 10 $V_{pk\text{-}pk}$ AC signal was applied to the to the system for different lengths of time, 20, 10 and 5 seconds, over a frequency range of 1 kHz-10 MHz at 5 points per decade. Observation of the dielectrophoretic experiments were carried out through a microscope (Nikon Eclipse 400) and images were taken before the signal was applied and after the lengths of times (as mentioned above) the signal was applied for each frequency point. This was performed using image acquisition software (PhotoLite) on a PC connected to the microscope and television monitor. The objective lens of the microscope was focussed on a single dot and the system was not disturbed. Images captured and subsequently analysed by Image processing algorithms using Matlab 7. An image of yeast cells captured and analysed is shown in FIG. 2.

Results and Analysis

Electric Field Distribution within 2 Electrode Dot Microsystem

Figure 3:
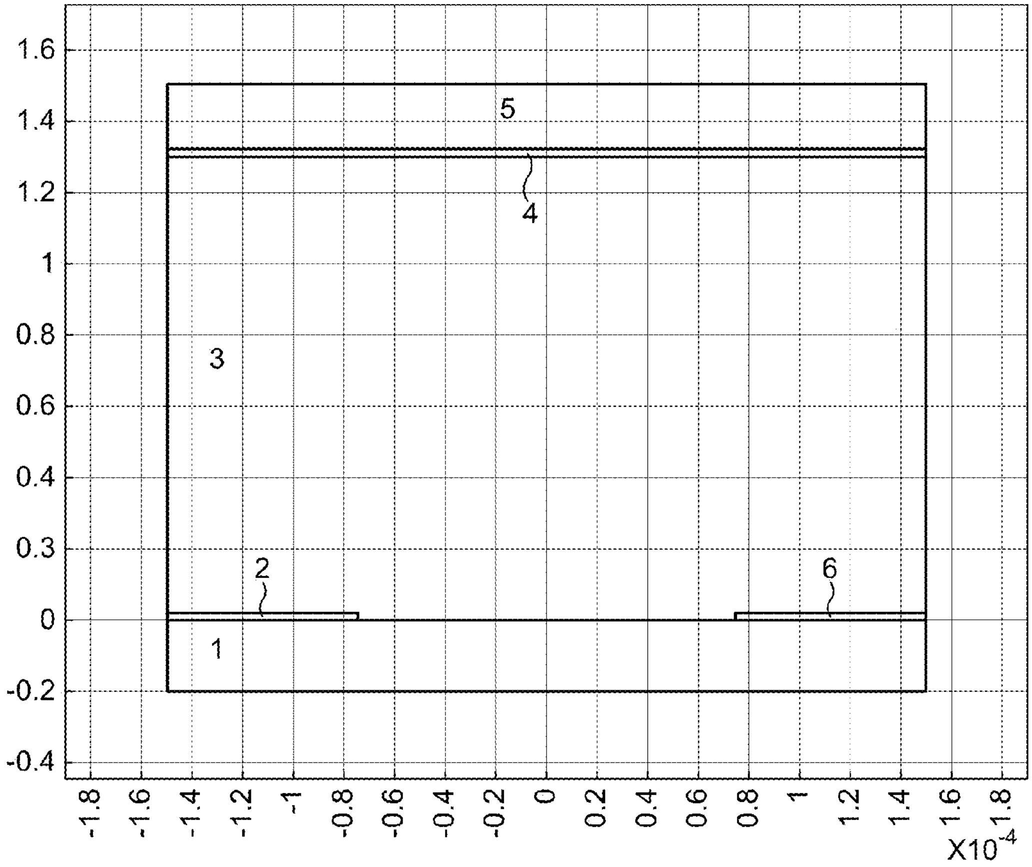
FIG. 3 shows a typical geometrical model of a dot system represented in two dimensions for the purposes of simulations described herein.

Electrostatic simulations conducted with finite element modelling package FEMLAB enabled us to visualise and quantify the field distributions within the modelled systems. Four differing dot diameter micro-systems were modelled in 2-D, with a constant height between top and bottom electrodes of 125 μm. The electrodes were given a constant thickness of 2 μm (whereas in reality the fabricated electrodes are <1 μm in thickness) in all of the models. FIG. 3 shows a typical geometrical model of how the dot system was represented in 2-D for the simulations. Regions 1 and 5 represent the glass substrate; region 2 and 6 represent gold electrodes; region 3 represents the suspending medium with no particles; region 4 represents the ITO electrode.

Figure 4:
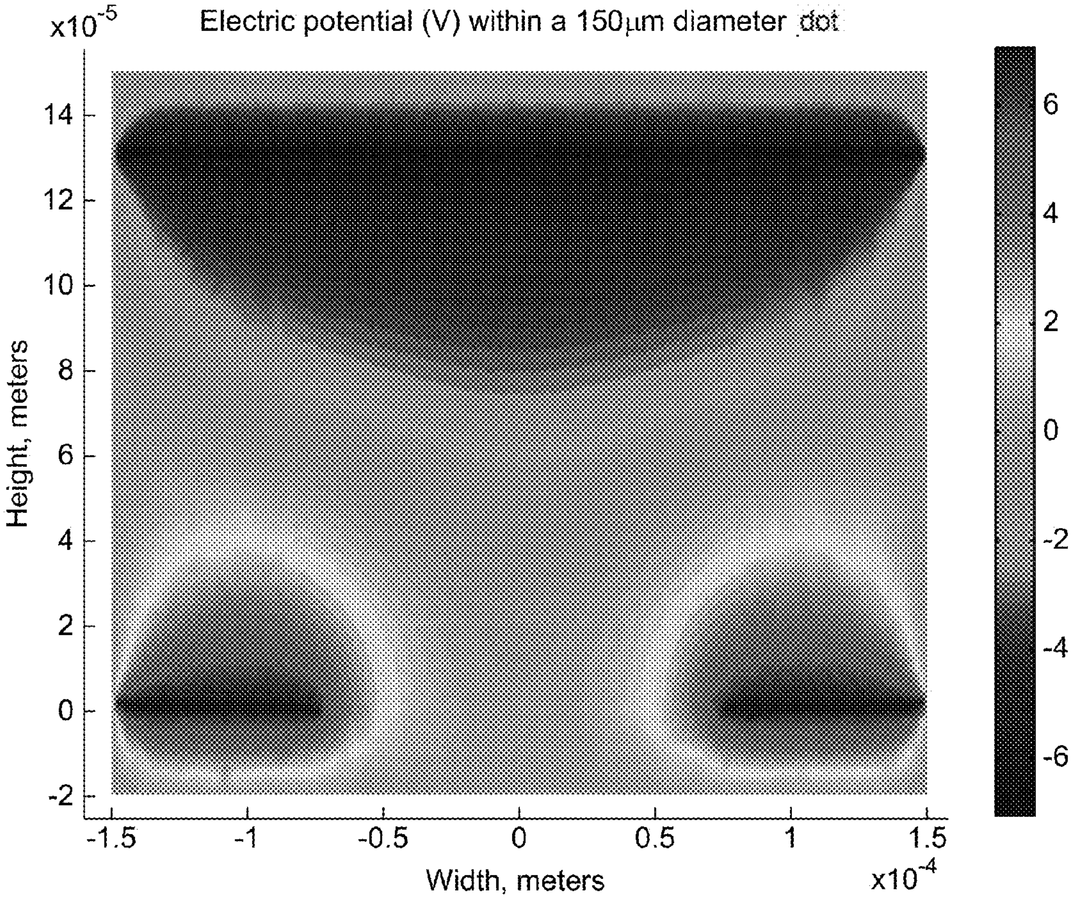
FIG. 4 shows a surface plot of electric potential within a 150 μm diameter dot. (The wide areas are over overshooting the range chosen for the colourbar)

The electrostatic potential distributed within the modelled system was found to vary with respect to the size of the dot diameter. With an applied potential of $10V_{RMS}$ applied to the gold electrode, and a negative potential of the same magnitude applied to the ITO electrode, it was seen that the centre of the system decreased from a positive potential to a more negative potential as the size of the diameter increased (FIG. 4).

Figure 5:
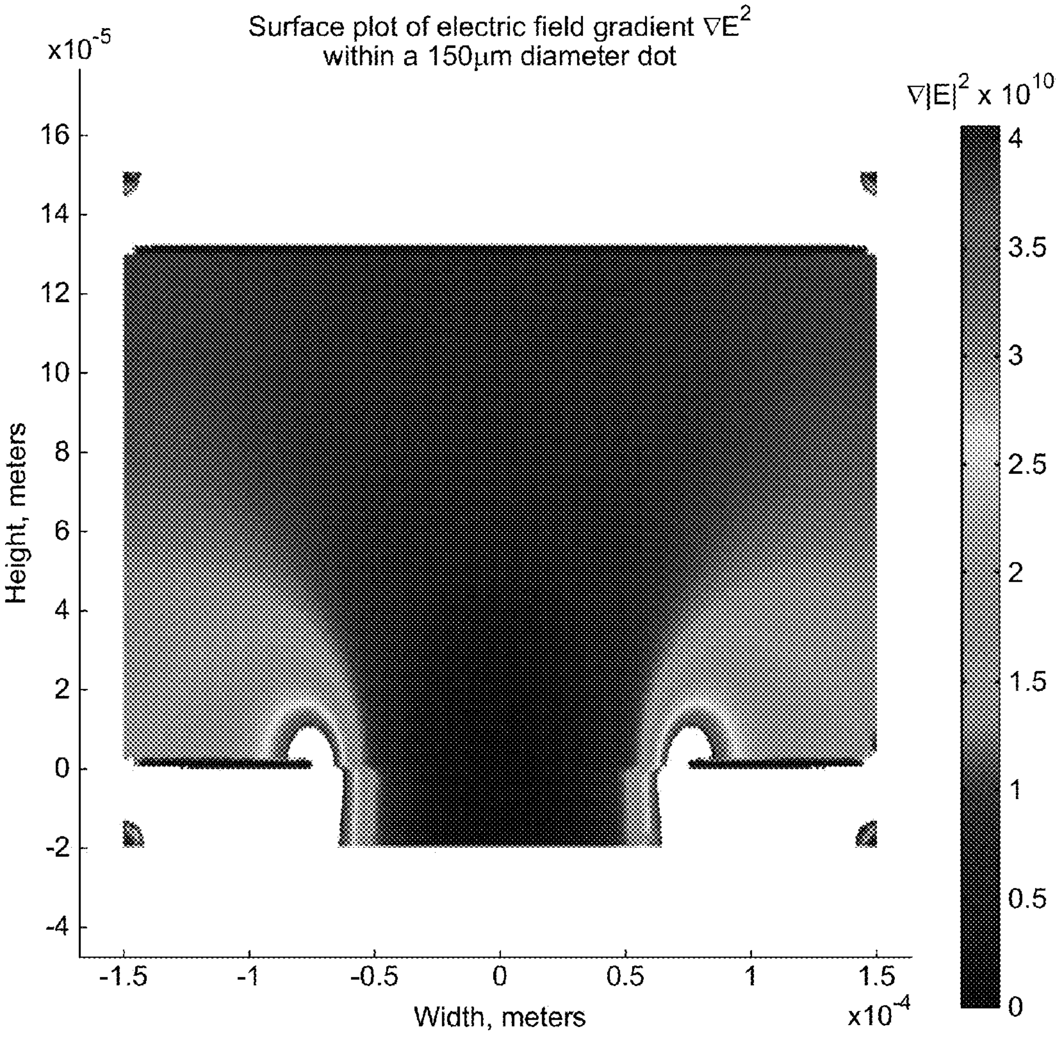
FIGS. 5 and 6 show surface plots of electric field gradient within a 150 μm diameter dot. (The wide areas are over overshooting the range chosen for the colourbar)
Figure 6:
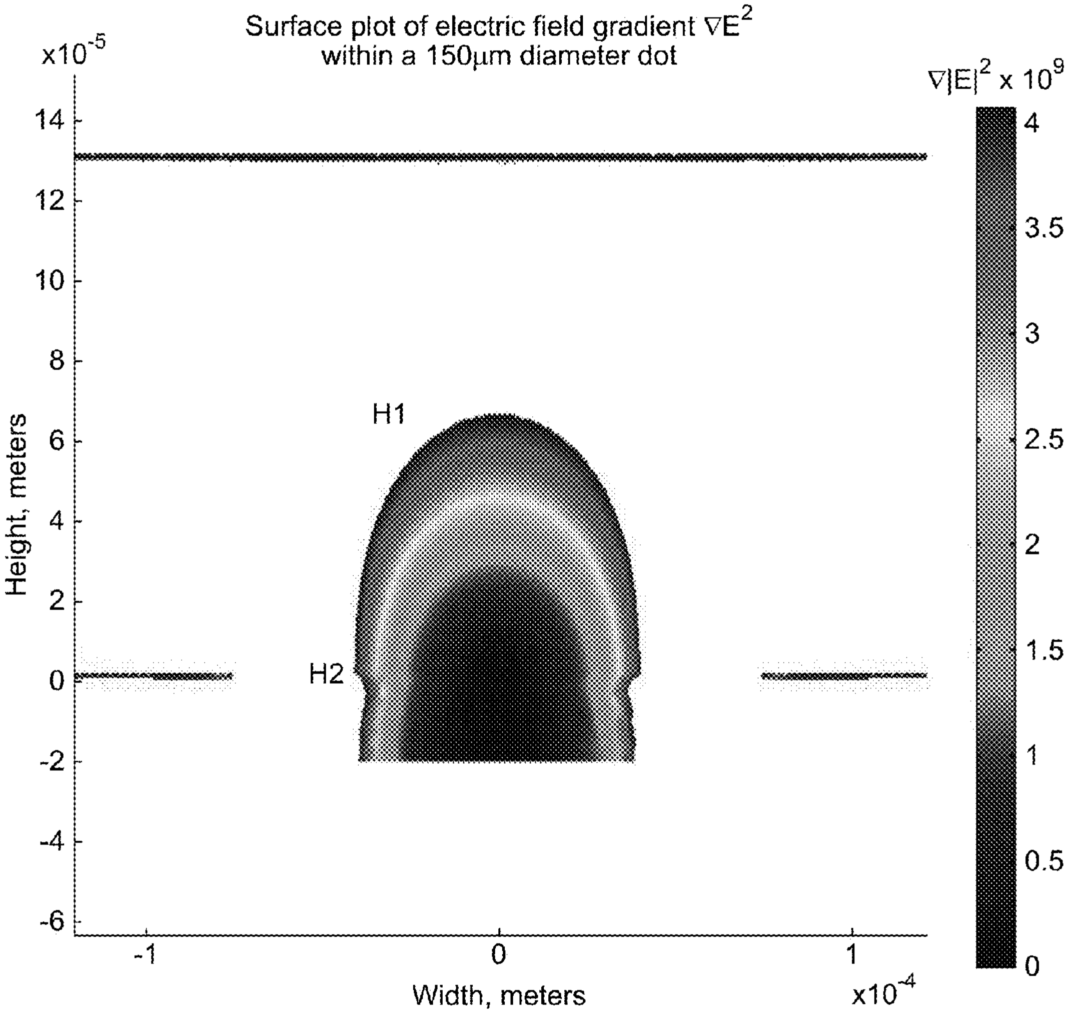
Figure 7:
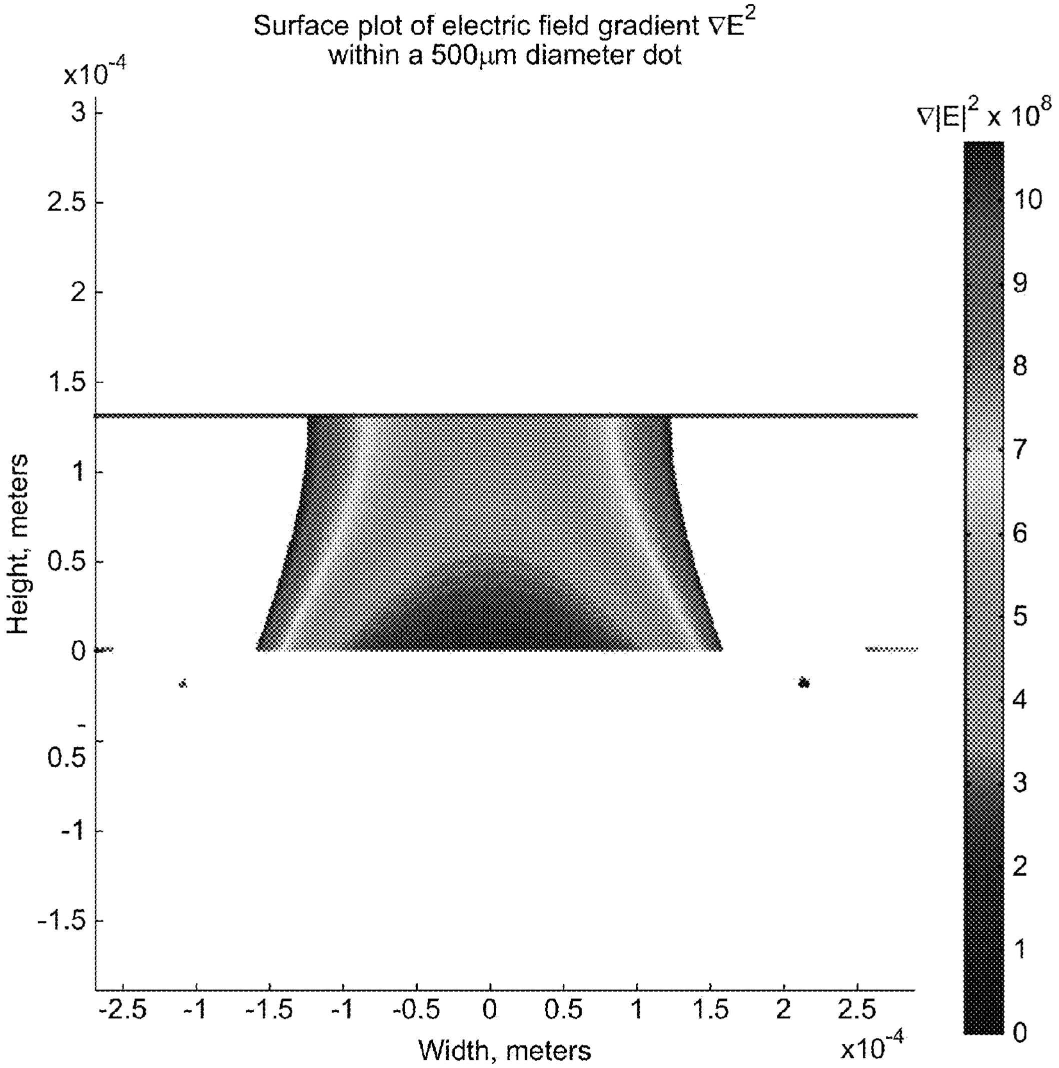
FIG. 7 shows a surface plot of electric field gradient within a 500 μm diameter dot. (The wide areas are over overshooting the range chosen for the colourbar)

The field gradient $|\nabla E^2|$ is obtained by taking the square of the electric field gradients in the x and y direction giving a magnitude at the electrode edge in the range of $1*10^{12}$ $V^2$ $m^{-3}$. The value of the electric field at the centre of the dot, just at the substrate surface of the analysis electrode was calculated to be $4.38*10^7$, $1.65*10^{10}$, $1.09*10^8$ and $1.63*10^8$ $V^2$ $m^{-3}$ for the 150 μm, 250 μm, 350 μm and 500 μm diameter dots respectively. Examining the centre of the each modelled system (FIGS. 5, 6 and 7) shows that the field gradient decreases as you move away from the substrate surface of the analysis electrode. But there appears to be an increase in magnitudes at the centre with respect to dot sizes. At the centre of the dot, approximately midway between top and bottom electrode planes the magnitudes of the field gradients became larger as the size of the dot diameter decreased. Values of $6*10^9$, $2.28*10^9$, $9.98*10^8$, $4.19*10^8$ $V^2$ $m^{-3}$ were found for the 150 μm, 250 μm, 350 μm and 500 μm dot diameters respectively at those points. As the top electrode was approached the magnitudes of the field gradient remained greater for the dots with a smaller radius.

The characteristic field gradient distribution can be seen to adopt a dome-like geometry at the centre of the dot. The dome shape is more pronounced for smaller diameter dots, but as the diameter increases the dome's edges begin to slope at an angle as the centre is approached, contributing to a more triangular field gradient distribution of weaker magnitude. Around the electrode edge the field gradient rapidly decreases by a magnitude of 1, approximately one-fifth away from electrode edge as the centre of the dot is approached.

The electric field lines entering the suspending medium from the electrode edge show components parallel and perpendicular to the electrode surface. This suggests that a dielectric particle located at the centre of the dot at a specific height (H1) in the electrode system of FIG. 6 will experience a force that is stronger in magnitude than a particle of the same dielectric makeup, situated the same distance away but at a height (H2) which is lower than that of H1 and overall a shorter distance away from the electrode edge. It is then believed that a suspension of concentrated particles suspended within this electrode system will, under positive dielectrophoresis, collect at the dot perimeter with particles in the bulk of the solution exhibiting rapid movement compared to those which are further away and in a lower plane to those in the bulk of the medium. Under negative dielectrophoresis, the low field gradient is situated at the centre of the dot in the plane near the glass substrate. This suggests that a suspension of concentrated particles experiencing a negative force will tend to occupy regions available in the centre of the dot which could lead to, as cells experiencing positive DEP may tend to, pile up above each other.

Different size dots against different yeast concentrations showed that as the size of the dot increased in diameter, a yeast cell located at the centre of a dot took a longer time to reach the edge of the dot under positive dielectrophoresis. A yeast cell located at the centre of a dot 500 μm, 300 μm, 250 μm and 150 μm in diameter, traveled towards the edge of the dot (positive DEP) at a velocity of 0.44 $\mu ms^{-1}$, 0.70 $\mu ms^{-1}$, 0.66 $\mu ms^{-1}$ and 2.84 $\mu ms^{-1}$ respectively for a concentration of $10^7$ cells per ml. A yeast cell travelling towards the centre from the edge of the dot (negative DEP) had velocities of 0.18 $\mu ms^{-1}$, 0.19 $\mu ms^{-1}$, 0.26 $\mu ms^{-1}$, 0.62 $\mu ms^{-1}$ for the 500 μm, 300 μm, 250 μm and 150 μm dot diameters respectively. Approximately 6.5 times faster for the 150 μm diameter dot than the 500 μm dot under positive DEP, and 4.5 times faster for the 150 μm diameter dot under positive DEP compared to negative DEP.

Figure 8:
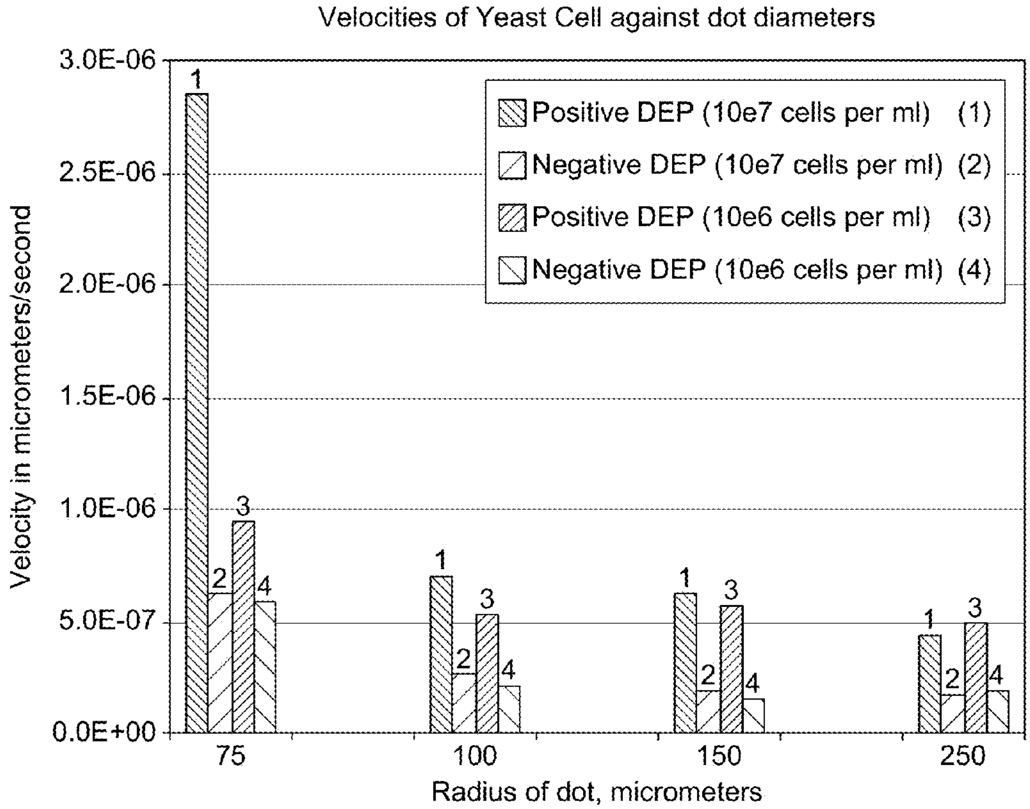
FIG. 8 shows velocities of single yeast cell as a function of dot radius and sample concentration.

As the concentration of yeast cells were reduced, a drop in cell velocities was observed. For a yeast cell, in a sample solution of $10^6$ cells per ml, the velocities of the yeast cells under positive DEP were found to be 0.5 $\mu ms^{-1}$, 0.56 $\mu ms^{-1}$, 0.53 $\mu ms^{-1}$ and 0.94 $\mu ms^{-1}$ for the 500 μm, 300 μm, 250 μm and 150 μm dot diameters respectively. Under negative DEP, there were further decreases in velocities for the respective cell concentration. Approximately 2 times faster for the 150 μm diameter dot than the 500 μm dot under positive DEP, and 3.2 times faster for the 150 μm diameter dot under positive DEP compared to negative DEP. FIG. 8 shows the differences in velocities of a yeast cell under positive and negative dielectrophoresis for a set of cell concentrations over a number of distances.

It was observed that as the concentration of cells increased and the size of the dot decreased the clearance rate of the suspended cells under positive dielectrophoresis was rapid. For a concentration of $10^6$ cells per ml, 68% of the cells were cleared from the centre of the 150 μm dot diameter within 1 minute and 100% within 2 minutes. Whilst for a concentration of $10^7$ cells per ml 87% of the cells were cleared within 1 minute and 100% within 2 minutes. In comparison for the 500 μm dot, it took 2 minutes to clear 77% and 87% for cell concentrations of $10^6$ and $10^7$ cells per ml respectively. It was established that an optimum concentration of yeast cells to use for rapid characterisation was a concentration of $10^8$ cells per ml, as the cells, once collected under positive DEP, dispersed rapidly to a uniform static state upon removal of the AC electric field. This is thought to be due to the negative surface charge on the particles causing them to repel each other and move away from the electrodes and also due to diffusion. For the rapid characterisation of particles on any size dot, it was found that yeast particles (~4 μm radius) displayed spontaneous redistribution on removal of the AC signal from the microsystem. For a dot size of 150 μm a 20 μl suspension of cells taken from a stock solution of $6.03*10^8$ cells per ml showed rapid redistribution on removal of the applied field. For a dot size of 300 μm a 20 μl suspension of cells taken from a stock solution of $7.6*10^9$ cells per ml showed a rapid redistribution on removal of the applied field. For a dot size of 500 μm a 20 μl suspension of cells taken from a stock solution concentrated to $\sim 5*10^{10}$ cells per ml showed the best redistribution process similar to the other dot sizes. In comparison, the average time taken for the process of redistribution with these concentrations were found to be about 1 minute, 30 seconds and 15 seconds for the 500 μm, 300 μm and 150 μm dots respectively.

Figure 9:
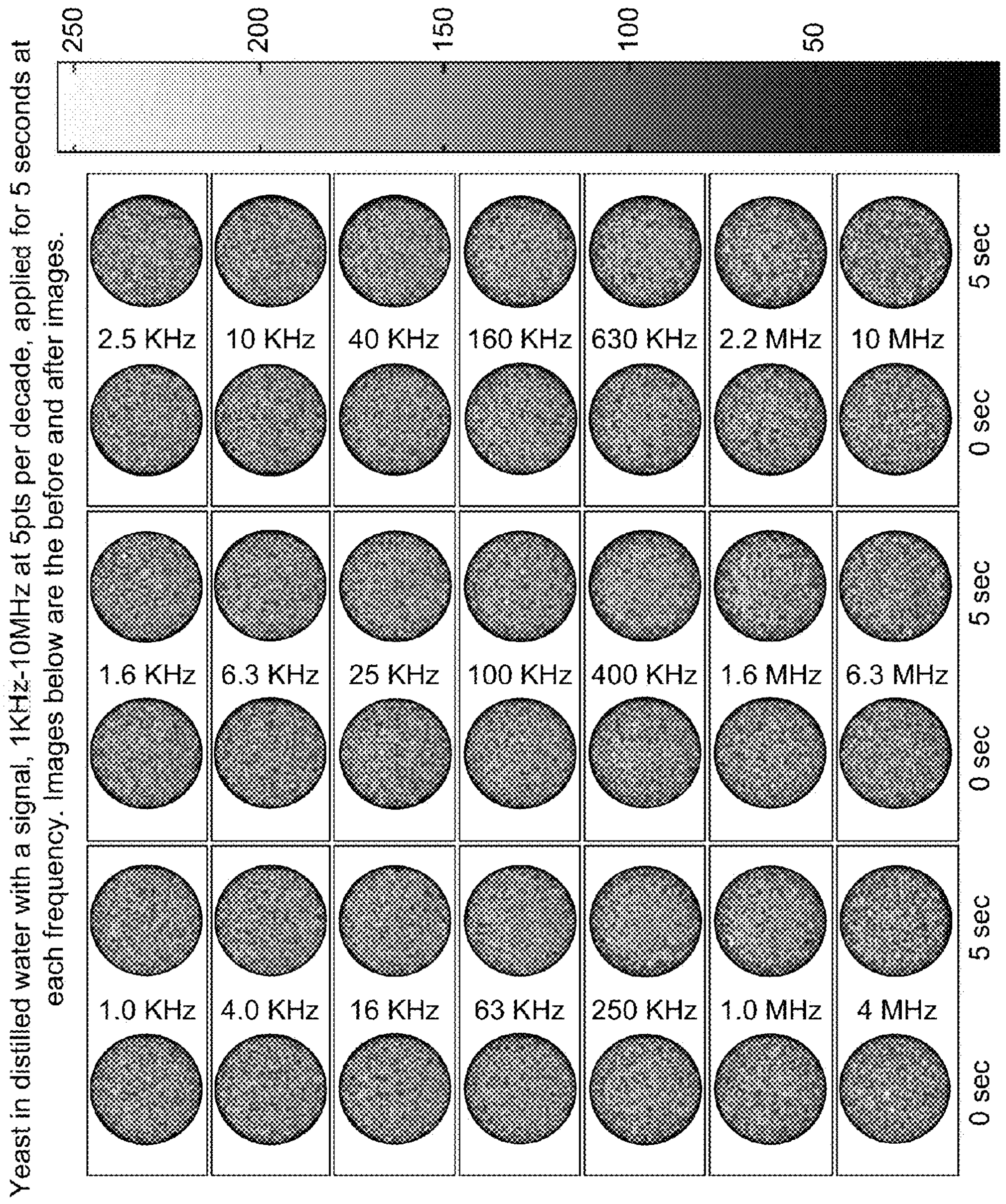
FIG. 9 shows before and after images captured for 21 frequency points.

An AC signal was applied to the electrodes and images were captured at set time intervals as detailed in the material and methods section. A typical set of images captured for frequency points, 5 points per decade, between 1 kHz and 10 kHz is shown in FIG. 9. The colour bar on the right of the montage indicates the levels of greyscale intensity within the image.

Determination of Dielectric Properties of Homogeneous Populations Using Dielectrophoretic Spectrum Data Obtained from Image Analysis Given the dielectric properties of a continuous suspending medium which has a dispersion of particles similar in biophysical makeup, the dielectric properties of the dispersed phase can be found by analysis of the dielectrophoretic spectrum [2, 25-28]. The frequency at which a particle changes from being negatively polarised to positively polarised or vice versa is known as the cross-over frequency ($f_c$). At this frequency the net magnitude of the dielectrophoretic force is zero, hence particles will not exhibit any movement. The multi-shelled model of Irimajiri et al and Huang et al [30, 31] was used to define the frequency dependency of the dispersed phase (yeast cells) suspended in low conductive media. The model is based on dielectric theories whereby the electrical properties of spherical cells, can be described in terms of concentric spheres that are "smeared" out. That is for a spherical cell of $N_i$ heterogeneous concentric compartments, the multi-shell describes that particle, in terms of the dielectric properties of the concentric compartments, as a homogeneous particle.

Figure 10:
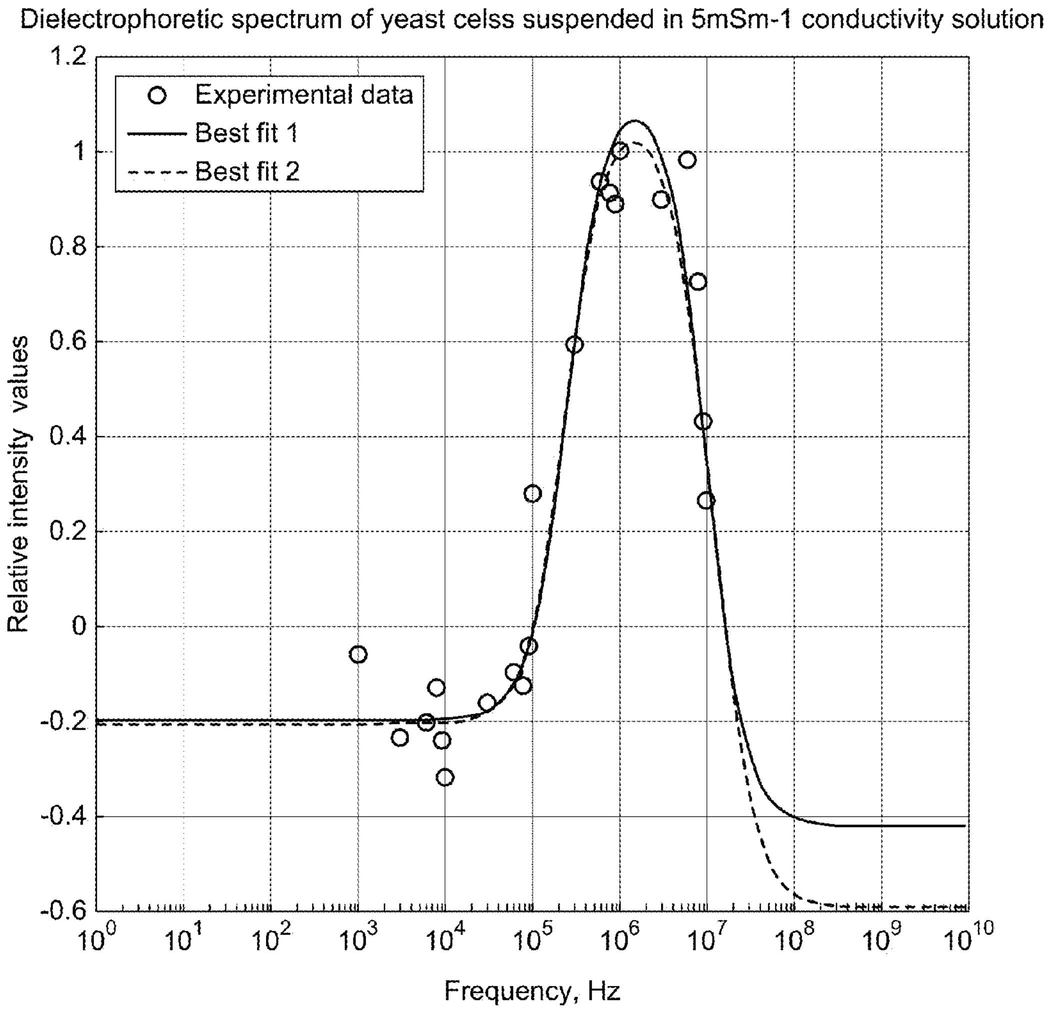
FIG. 10 shows the dielectrophoretic spectrum obtained for yeast cells suspended in 5 $mSm^{-1}$ of potassium chloride (o) and its best fit (–).

The dielectrophoretic spectrum obtained for the yeast cells suspended in 5 $mSm^{-1}$ of potassium chloride (o) and its best fit (–) are shown in FIG. 10. The best fit curve was obtained using the fminsearch function of MATLAB, which is based on the Nelder-Mead simplex method [32, 33]. The function minimises the error of several variables, based on the function inputted to be minimised [6, 31, 34]. The error function to be minimised based on starting values of the cells cytoplasm, cell wall and cell membrane dielectric properties is $$\sum_i^N (R_{sim}(\omega_i) - \alpha R_{exp}(\omega_i))^2 = 0 \quad \text{Equation 2.1}$$

where N is the number of experimental frequency points based on $\omega_I$, $R_{sim}$ is the simulated value of the real part of the Clausius-Mossotti factor, $R_{exp}$ is the arbitrary value of the experiment and α is the weight given to the experimental values in the iterative minimisation procedure.

The initial starting values for the curve fitting procedure were taken to be 50, 6 and 60 for the relative permittivity of the cell cytoplasm, cell membrane and cell wall respectively. The conductivity of the cytoplasm, cell wall and cell membrane were taken to be 0.2 $Sm^{-1}$, $2.5*10^{-7}$ $Sm^{-1}$ and 0.01 $Sm^{-1}$ [31]. The cell radius was kept constant at 4 μm, with the cell membrane and cell wall being 8 nm and 0.22 μm respectively. Parameters set for this iterative procedure were a maximum function evaluation of 3000, maximum iteration of 5000 and an error tolerance of $1*10^{-25}$.

This yielded final values of 0.031 $Sm^{-1}$, 0.1 $Sm^{-1}$ and $1.43*10^{-7}$ $Sm^{-1}$ for the cell wall, cytoplasm and cell membrane respectively. The relative permittivities at the end of the minimisation procedure were 1.62, 43 and 8.6 for the membrane, cytoplasm and cell wall respectively. The value of the error function was 1.023 with an initial weighting of 1 and a final weighting of 0.59.

The spectrum of the best fit curve with different initial permitivities values is also shown in FIG. 10. Initial starting values for the curve fitting procedure were set at 50, 10 and 50 for the relative permittivity of the cell cytoplasm, cell membrane and cell wall respectively. The conductivity of the cytoplasm, cell wall and cell membrane were left the same. The end values are 10, 2 and 59 for the relative permittivity of the cell cytoplasm, cell membrane and cell wall respectively; and 0.029 $Sm^{-1}$, 0.094 $Sm^{-1}$ and $3.42*10^{-7}$ $Sm^{-1}$ for the cell wall, cytoplasm and cell membrane respectively. The final weight given to the values was 0.62 and the value of the error function was 1.01.

From the experimental data, a lower frequency point was calculated to be at 91.36 kHz. The curve fitting data was able to calculate the Clausius-Mossotti factor at higher frequencies, hence a lower crossover frequency was found at 102 kHz and a high crossover frequency was found at 16 MHz for both best fit curves.

The magnitude of the dielectrophoretic force was determined from the intensity histograms of the before and after images at each frequency point.

Figure 11:
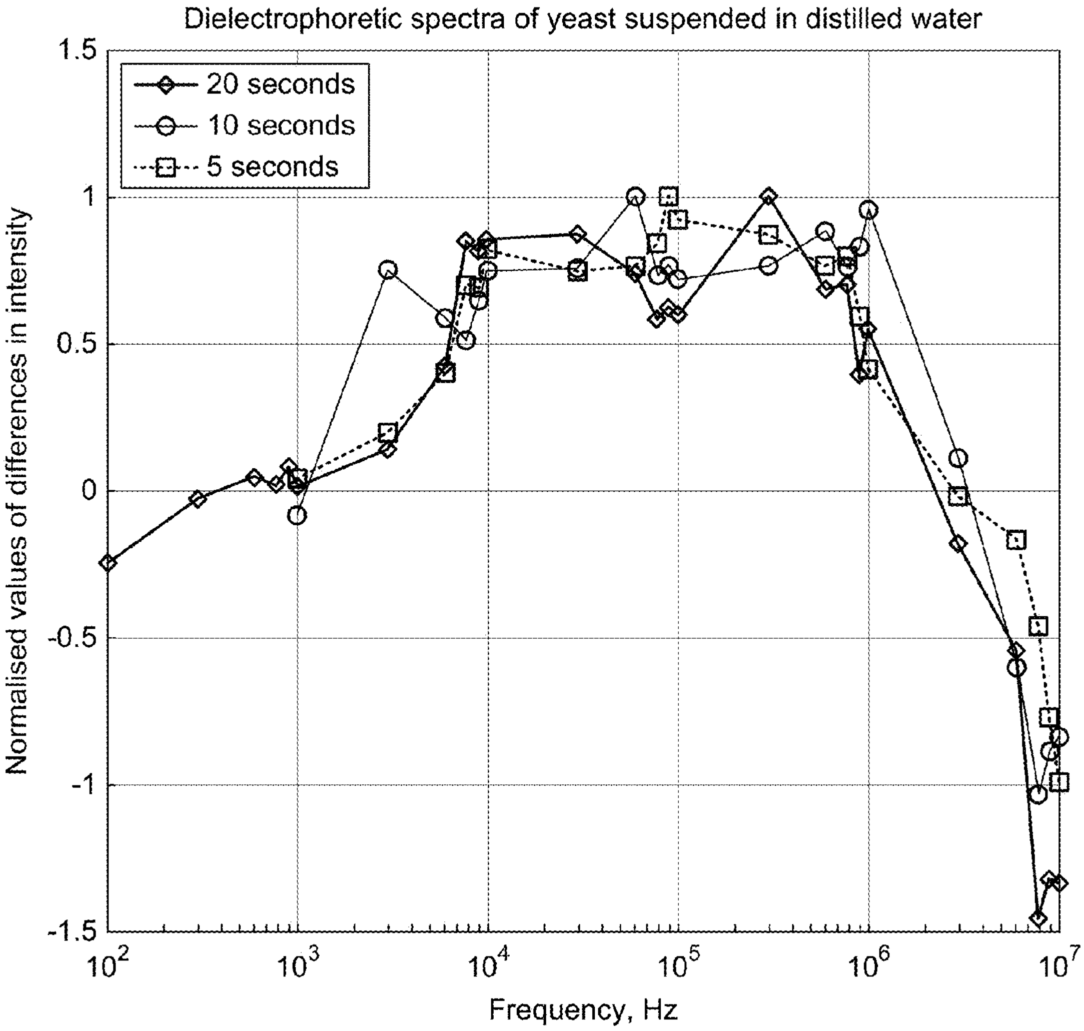
FIG. 11 shows yeast DEP spectra suspended in distilled water.
Figure 13:
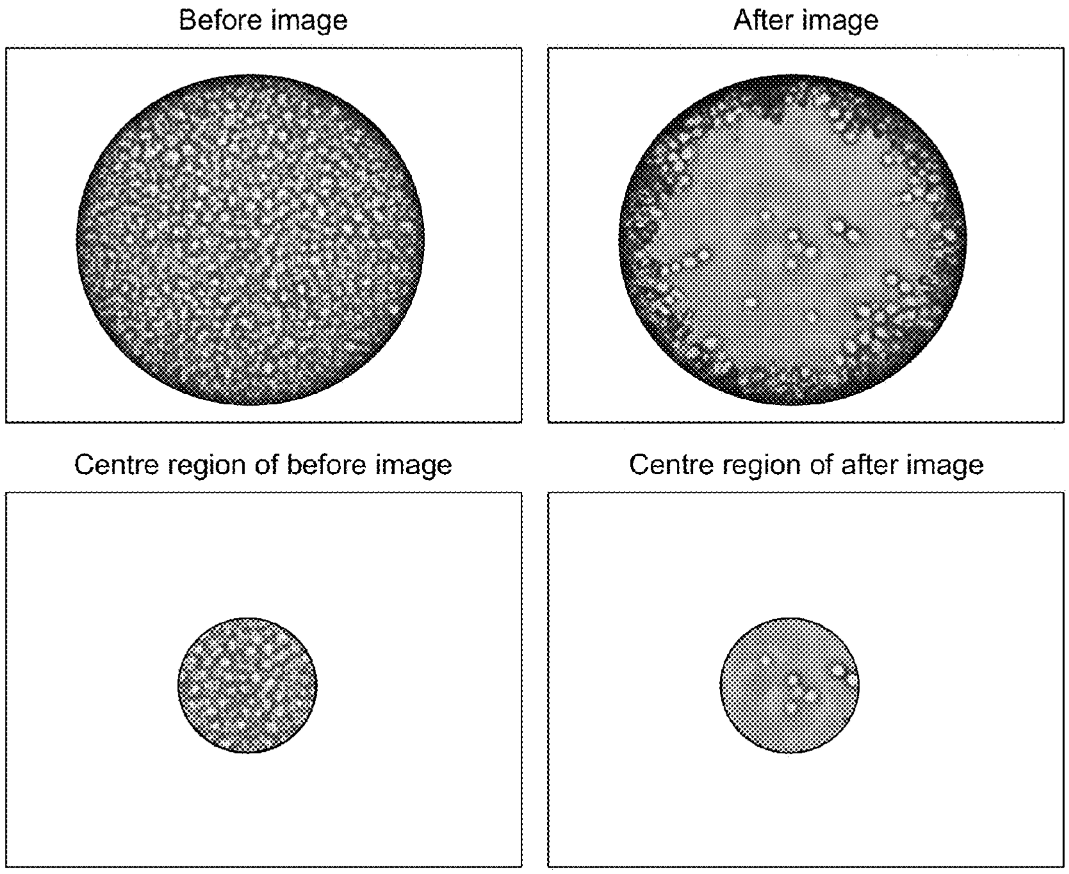
FIG. 13 shows before and after images showing positive DEP, with their corresponding processed region at the centre of the dot.

From analysing the images and taking the before image at each frequency as the reference point, positive dielectrophoresis was observed at the centre of the dot by seeing a clearing of the cells. From the histogram there is an obvious increase in the after image of lighter intensity values corresponding to single cells being more defined (centre of the dot having a lensing effect on light shone onto the cells) and the background illumination (glass substrate region) of incident light. Hence, for a concentration of cells such as that shown in the before image of FIG. 13, the majority of darker intensity values (pixels) are due to the stacking of cells above each other, the structural boundaries associated with the cell (i.e. cell wall and membrane) and the gold electrode surface. By performing post-processing techniques in the centre region of the dot only (FIG. 13) it was possible to discriminate between positive and negative dielectrophoresis by comparing the histograms of both before and after images. This method was used to obtain the spectrum of yeast in water with different time intervals (FIG. 11).

Figure 12:
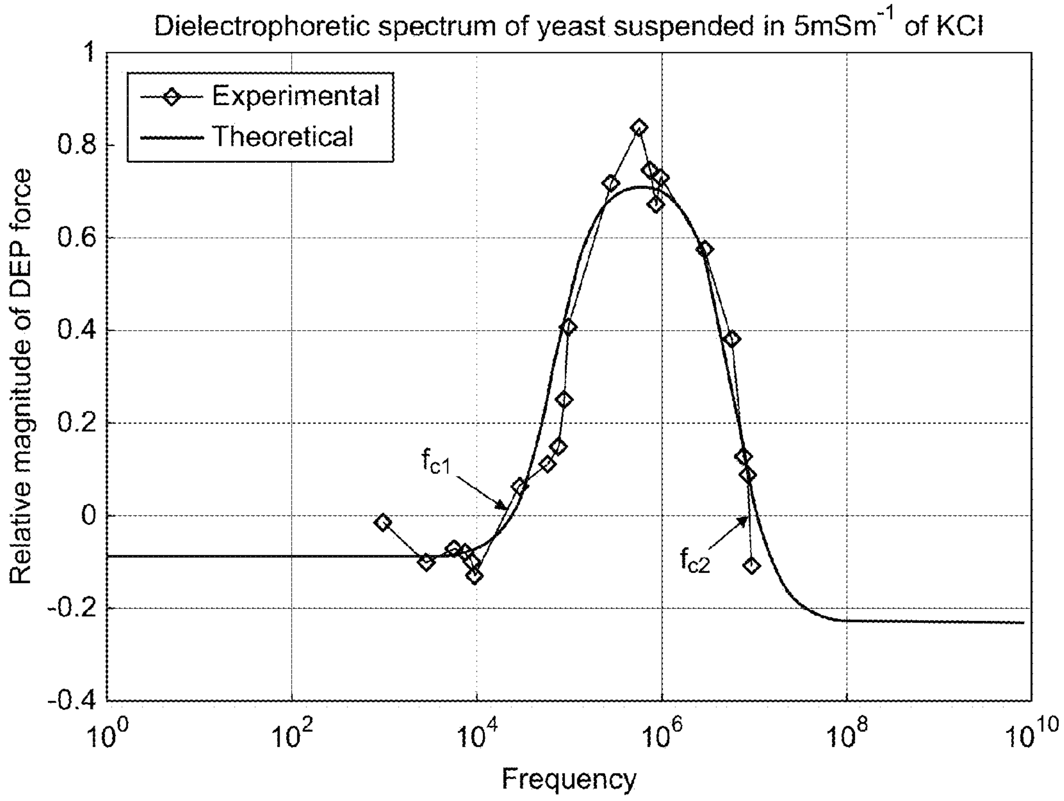
FIG. 12 shows experimental curve and multi-shelled model of yeast in 5 $mSm^{-1}$ KCl.
Figure 14:
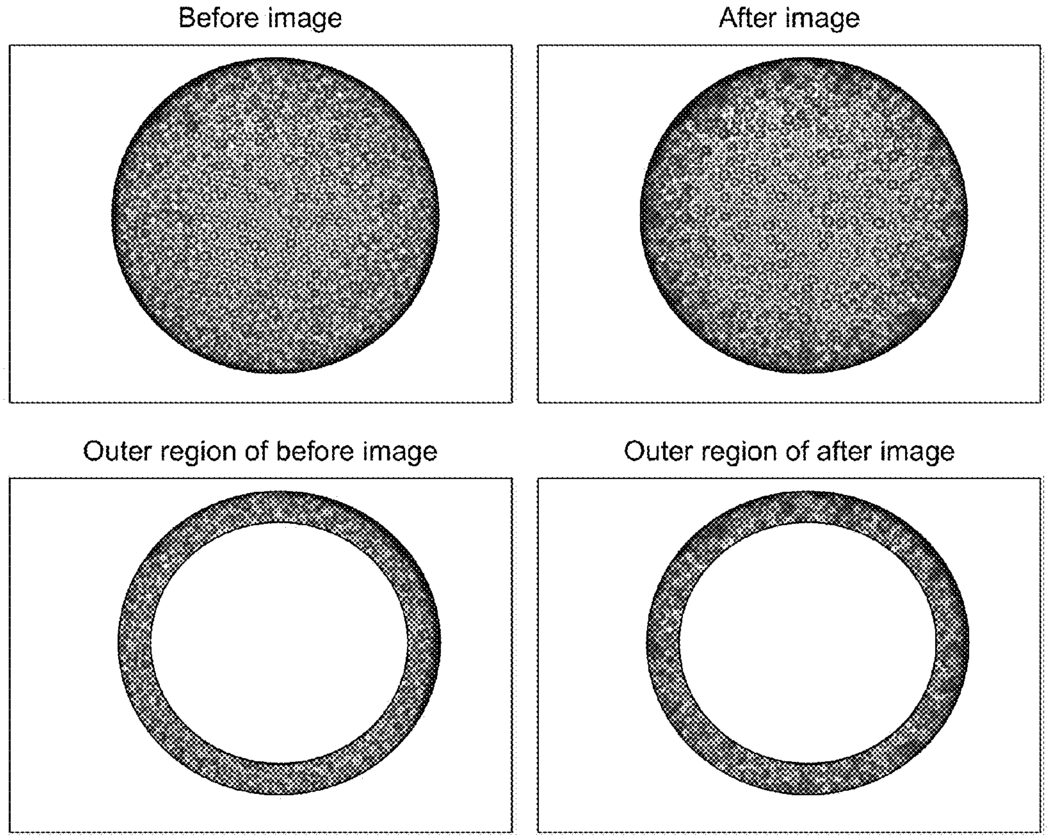
FIG. 14 shows before and after images showing positive DEP, with their corresponding processed region near the electrodes.

A variation to this method was used for the outer region of the dot, closer to the electrode edge. In this instance a decrease in the cumulative sum of intensity values (pixels) with respect to the before image corresponded to cells being attracted to the electrode edge and hence defining positive dielectrophoresis. An increase in the cumulative sum of intensity values with respect to the before image will correspond to cell being pushed to the centre of the dot, defining negative dielectrophoresis. This method was used in obtaining the spectrum of yeast cells suspended in 5 $mSm^{-1}$ of KCl (FIG. 12). FIG. 14 shows the regions analysed near the electrode edge.

Figure 15:
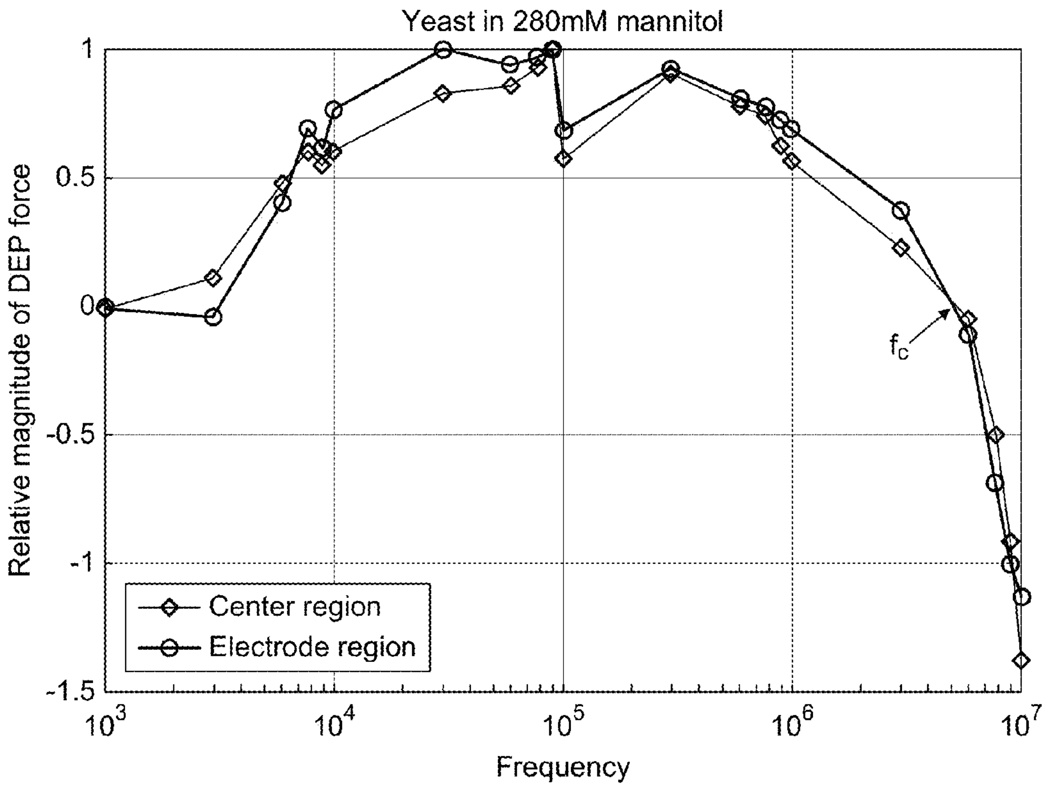
FIG. 15 shows yeast suspended in 280 mM mannitol, with electric field applied for 5 seconds per frequency.

The techniques described above were utilised on another set of experimental data, simultaneously. The dielectrophoretic spectrum of yeast suspended in 280 mM of mannitol is shown in FIG. 15 and it shows the frequency response of yeast cells obtained from analysing the centre and outer region of the dot. Both curves show a striking similarity, with similar magnitudes of response on change of frequency. An interesting observation is the high end cross over frequency ($f_c$) found at ~5 MHz for both curves. The low end of the frequency range shows a little discrepancy at 3 kHz, but continues to exhibit similar rises and falls afterwards.

Electric field Distribution within 3 Electrode Dot Microsystem

As shown in FIG. 17, with the third electrode grounded, and the top and analysis electrodes energised as normal, there is no significant difference in the electric field gradient distribution. The third electrode and the dielectric between the analysis electrode and the third electrode have been modelled with a thickness of 1 μm. All other geometrical sizes have remained the same for the two electrode system modelled herein.

CONCLUSION

A rapid technique based on image processing has been shown to detect both positive and negative dielectrophoresis, and their relative magnitudes. The device used provides definite region of examination in which it was possible to clearly discriminate between positive and negative DEP, which is a measure of the effective polarizability of the particle (equation 2). Samples tested with the device of the invention have shown to be higher in density than other techniques capable of being automated [17, 28]. Further Image processing techniques such as image enhancement also provide a means of reducing any noise artefacts present and thus Increase further the sensitivity of the device without the need of expensive Instrumentation. The division of regions processed in the image can be divided into concentric regions and processed individually before being combined to obtain a more accurate reflection of the DEP spectra. This smooths out the curve and provides a more accurate measure than single region-based processing. This increased sensitivity enables the rapid characterisation of particles, and therefore enables extraction of biophysical properties from the spectrum from their crossover frequencies.

It should be understood that various changes and modifications to the presently preferred embodiments described herein will be apparent to those skilled in the art. Such changes and modifications can be made without departing from the spirit and scope of the present Invention and without diminishing its attendant advantages. It is therefore intended that such changes and modifications are covered by the appended claims.

REFERENCES

1. Pohl, H. A., *Dielectrophoresis*. 1978, Cambridge, UK: Cambridge University Press.
2. Zhou, X.-F., et al., *Differentiation of viable and non-viable bacterial biofilms using electrorotation*. Biochimica Et Blophysica Acta, 1995. 1245: p. 85-93.
3. Yang, J., et al., *Dielectric Properties of Human Leukocyte Subpopulations Determined by Electrorotation as a Cell Separation Criterion*. Biophys. J., 1999. 76(6): p. 3307-3314.

4. Johari, J., et al., *Dielectrophoretic assay of bacterial resistance to antibiotics*. Physics In Medicine And Biology, 2003. 48: p. N193-N198.
5. Hughes, M. P., H. Morgan, and F. J. Rixon, *Measuring the dielectric properties of herpes simplex virus type* 1 *virions with dielectrophoresis*. Biochimica Et Biophysica Acta, 2002. 1571(1): p. 1-8.
6. Labeed, F. H., et al., *Assessment of Multidrug Resistance Reversal Using Dielectrophoresis and Flow Cytometry*. Biophysical Journal, 2003. 85(3): p. 2028-2034.
7. Holzel, R., *Nystatin-induced changes in yeast monitored by time resolved automated single cell electrorotation*. Biochimica Et Biophysica Acta, 1998. 1425: p. 311-318.
8. Huang, Y., et al., *Membrane changes associated with the temperature-sensitlve P85gag-mos-dependent transformation of rat kidney cells as determined by dielectrophoresis and electrorotation*. Biochimica et Biophysica Acta (BBA)—Biomembranes, 1996. 1282(1): p. 76-84.
9. Hubner, Y., K. F. Hoettges, and M. P. Hughes, *Water quality test based on dlelectrophoretic measurements of fresh water algae Selenastrum capricornutum*. Journal Of Environmental Monitoring: JEM, 2003. 5(6): p. 861-864.
10. Becker, F. F., et al., *Separation of human breast cancer cells from blood by differential dielectric affinity*. Proc. Natl. Acad. Sci. U.S.A., 1995. 92: p. 860-864.
11. Cheng, J., et al., *Isolation of Cultured Cervical Carcinoma Cells Mixed with Peripheral Blood Cells on a Bioelectronic Chip*. Analytical Chemistry, 1998. 70(11): p. 2321-2326.
12. Markx, G. H., M. S. Talary, and R. Pethig, *Separation of viable and non-viable yeast using dielectrophoresis*. Journal of Biotechnology, 1994. 32(1): p. 29.
13. Hughes, M. P., *Strategies for dielectrophoretic separation in laboratory-on-a-chip systems*. Electrophoresis, 2002. 23(16): p. 2569-2582.
14. Wang, X.-B., et al., *Theoretical and experimental investigations of the interdependence of the dielectric, dielectrophoretic and electrorotational behaviour of colloidal particles*. J. Phys. D: Appl. Phys, 1992. 26: p. 312-322.
15. Huang, Y., et al., *Differences in the AC electrodynamics of viable and non-viable yeast cells determined through combined dielectrophoresis and electrorotation studies*. Physics In Medicine And Biology, 1992. 37(7): p. 1499-1517.
16. Wang, X., X.-B. Wang, and P. R. C. Gascoyne, *General expressions for dielectrophoretic force and electrorotational torque derived using the Maxwell stress tensor method*. Journal of Electrostatics, 1997. 39(4): p. 277-295.
17. Talary, M. S. and R. Pethig, *Optical technique for measuring the positive and negative dielectrophoretic behaviour of cells and colloidal suspensions*. IEE Proc.-Sci Meas. Technology, 1994. 141(5): p. 395-399.
18. Burt, J. P., T. A. K. Al-Ameen, and R. Pethig, *An optical dielectrophoresis spectrometer for low-frequency measurements on colloidal suspensions*. Journal of Applied Physics E: Sci. Instrum., 1989. 22: p. 952-957.
19. Price, J. A. R., J. P. Burt, and R. Pethig, *Applications of a new optical technique for measuring the dielectrophoretic behaviour of microorganisms*. Biochimica Et Biophysica Acta, 1988. 964: p. 221-230.
20. Chan, K. L. G., P. R. C; Becker, F. F.; Pethig, R, *Electrorotation of liposomes: verification of dielectric multishell model for cells*. Biochimica Et Biophysica Acta, 1997.1349: p. 182-196.
21. Gascoyne, P., et al., *Dielectrophoretic detection of changes in erythrocyte membranes following malarial infection*. Biochimica et Biophysica Acta (BBA)—Biomembranes, 1997. 1323(2): p. 240-252.
22. Chan, K. L., et al., *Measurements of the dielectric properties of peripheral blood mononuclear cells and trophoblast cells using AC electrokinetic techniques*. Biochimica et Biophysica Acta (BBA)—Molecular Basis of Disease, 2000. 1500(3): p. 313-322.
23. Jones, T. B., *Electromechanics of Particles*. 1995, Cambridge: Cambridge University Press.
24. Hoettges, K. F., et al., *Fast prototyping of microfluidic devices for separation science*. Chromatographia, 2001.53: p. S-424-S-426.
25, Ramos, A., et al., *Ac electrokinetics: a review of forces in microelectrode structures*. Phys. D: Appl. Phys, 1998(31): p. 2338-2353.
26. Pethig, R., et al., *Positive and Negative Dielectrophoretic collection of colloidal, particles using interdigitated, castellated, microelectrodes*. Journal of Physics D: Applied Physics, 1992. 25: p. 881-888.
27. Irimajiri, A. H., T; Inouye, A, *A Dielectric Theory of 'Multi-Stratified Shell' Model with its Application to a Lymphoma Cell*. Journal of Theoretical Biology, 1979.78: p. 251-269.
28. Gascoyne, P. R., et al., *Dielectrophoretic separation of mammalian cells studied by computerised image analysis*. Measurement Science and Technology, 1992. 3: p. 439-445.

The invention claimed is:

1. A device for dielectrophoretic characterisation of particles which comprises an analysis electrode and a separate cover electrode having planar surfaces which face each other, wherein the analysis electrode comprises an electrically conductive layer of material provided on a substrate support and a plurality of apertures are defined through the electrically conductive layer, the device further comprising a non-uniform electric field generator coupled to the analysis electrode and the cover electrode, the non-uniform electric field generator configured to form a non-uniform electric field that is distributed axisymmetrically about the central axis of an aperture among the plurality of apertures, wherein, in use, a sample medium is placed between the analysis electrode and the cover electrode and the sample medium consists of particles suspended in a solvent.

2. A device according to claim 1, wherein no further electrodes other than the analysis electrode and the cover electrode are present.

3. A device according to claim 1, wherein the electrically conductive layer is planar.

4. A device according to claim 1, wherein the cover electrode is planar.

5. A device according to claim 1, wherein the surfaces of the cover electrode and the analysis electrode facing each other are planar and parallel.

6. A device according to claim 1, wherein a spacer which is not electrically conductive is positioned between the cover electrode and the analysis electrode.

7. A device according to claim 1, wherein the analysis electrode is connected to one phase of an AC voltage source and the cover electrode is connected to either a counter phase or ground of an AC voltage source.

8. A device according to claim 1, wherein the sample medium consists of bio-particles such as cells, bacteria, spores or virus particles suspended in the solvent.

9. A device according to claim 1, wherein the substrate of the analysis electrode is of a transparent material.

10. A device according to claim 1, wherein the apertures are independently addressable with a multitude of different frequencies.

11. A device according to claim 10, wherein the size of the apertures ranges from between about 25 μm to about 1000 μm.

12. A device according to claim 1, wherein the surface of the analysis electrode is spaced about 30 μm to about 500 μm from the surface of the cover electrode.

13. A device according to claim 1, wherein the electrically conductive layer of the analysis electrode is of a transparent material.

14. A device according to claim 1, wherein the analysis electrode comprises an electrically conductive layer of one or more of gold, chromium, titanium, platinum or indium tin oxide.

15. A device according to claim 1, wherein the substrate of the analysis electrode is manufactured of a material selected from the group consisting of glass, quartz, polycarbonate, polyethyleneterephtalate, polysulfone polymethylmethacrylate, polyimide and other transparent materials.

16. A device according to claim 1, wherein the apertures extend through the entire electrically conductive layer of material and are of a circular cross section.

17. A device according to claim 1, wherein the apertures through the analysis electrode are annular leaving a circular island in the centre of the aperture.

18. A device according to claim 17, wherein the material of the island is of a conductive material and it is not electrically connected to the analysis electrode.

19. A device according to claim 18, wherein the material of the island comprises one or more of a colloid metal, gold, chromium, titanium, platinum or indium tin oxide.

20. A device according to claim 18, wherein the material of the island is of a different conductive material to the material of the analysis electrode.

21. A device according to claim 18, wherein the islands of the analysis electrode are coated with one or more antibodies immobilised on the surface of the islands.

22. A device according to claim 18, wherein the islands of the analysis electrode are used for surface enhanced Raman detection.

23. A device according to claim 1, wherein an AC signal of between about 100 Hz and about 100 MHz is capable of being applied between the analysis electrode and the cover electrode.

24. A device according to claim 1, wherein an AC signal between about 0.1V (peak to peak) and about 100V (peak to peak) is capable of being applied between the analysis electrode and the cover electrode.

25. A device according to claim 1, wherein the substrate of the analysis electrode where it is exposed through the aperture is coated with one or more antibodies immobilised on the surface of the substrate.

26. A device according to claim 25, wherein the antibody is preselected and is specific for a bioparticle selected from the group consisting of a cell, bacteria, spore, virus particle, and protein.

27. A device according to claim 26, wherein the bioparticle is fluorescence labelled before or after binding to the surface bound antibody.

28. A device according to claim 1, further comprising a third electrode wherein the analysis electrode is situated between the cover electrode and the third electrode.

29. A device according to claim 28, wherein the third electrode is planar and parallel with the analysis electrode.

30. A device according to claim 28, wherein the third electrode and the analysis electrode are separated by a dielectric material.

31. A device according to claim 30, wherein the dielectric material has a uniform thickness.

32. A device according to claim 31, wherein the thickness of the dielectric material is about 10 nm to about 100 μm.

33. A device according to claim 28, wherein the third electrode is positioned on a substrate of a transparent material selected from the group consisting of glass, quartz, polycarbonate, polyethyleneterephtalate, polysulfone, and polymethylmethacrylate.

34. A device according to claim 28, wherein the third electrode has no apertures defined therein.

35. A device according to claim 28, wherein the third electrode has a uniform thickness and/or a thickness equal or less than about 1 μm.

36. A device according to claim 28, wherein the third electrode is of an electrically conducting material.

37. A device according to claim 36, wherein the third electrode is of a transparent conducting film (TCO).

38. A quartz crystal microbalance, a surface plasmon resonance detector, an evanescent light scattering detector, or a surface enhanced Raman detector comprising the device according to claim 1.

39. A method of carrying out dielectrophoresis of particles which comprises use of a device according to claim 1.

40. A method of carrying out dielectrophoresis of particles used to characterise particles according to their polarizability with regard to their medium wherein the method comprises the steps of placing a sample suspension of particulate matter between electrodes of a device according to claim 1 and generating a field between the electrodes.

41. A method according to claim 39, wherein positive dielectrophoresis is used to attract particles to the edge of the aperture through the electrically conductive layer of material of the analysis electrode, in the same plane as the planar abutment between the electrically conductive layer of material of the analysis electrode and the substrate of the analysis electrode.

42. A method according to claim 39, wherein negative dielectrophoresis is used to push particles to the centre of the aperture in the analysis electrode, in the same plane as the planar abutment between the electrically conductive layer of material of the analysis electrode and the substrate of the analysis electrode.

43. A method according to claim 39, wherein the method includes the step of using image-processing techniques to analyse different regions of an aperture in the analysis electrode separately.

44. A method according to claim 39, wherein the method includes the step of using image processing to measure concentration of particles at the edge of the aperture by analysing an annulus radially inwardly from the perimeter of the aperture.

45. A method according to claim 39, wherein the method includes the step of using image processing to measure concentration of particles in the centre of the aperture by analysing a circular disk in the centre of the aperture.

46. A method according to claim 39, wherein the method includes the step of using image processing to measure strength and direction of the dielectrophoretic force by comparing the concentration of particles at the edge of the aperture with the concentration of particles in the centre of the aperture.

47. A method according to claim 39, including one or more additional assays such as fluorescence-based assays or antibody-based assays.

48. A method for production of a device according to claim 1, which comprises the steps of providing an analysis electrode and a separate cover electrode wherein the analysis electrode comprises an electrically conductive layer of material provided on a substrate support and apertures are defined through the electrically conductive layer.

49. A device according to claim 1, further comprising:

image acquisition means for observing particles in an inter-electrode space through at least one aperture among the plurality of apertures.

* * * * *

UNITED STATES PATENT AND TRADEMARK OFFICE

CERTIFICATE OF CORRECTION

PATENT NO. : 8,524,063 B2
APPLICATION NO. : 11/990540
DATED : September 3, 2013
INVENTOR(S) : Hughes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,271 days.

Signed and Sealed this
Twenty-sixth Day of August, 2014

Michelle K. Lee
*Deputy Director of the United States Patent and Trademark Office*